(12) United States Patent
Sekiguchi et al.

(10) Patent No.: US 8,194,203 B2
(45) Date of Patent: Jun. 5, 2012

(54) LIQUID CRYSTAL DISPLAY DEVICE

(75) Inventors: Yoshifumi Sekiguchi, Hitachiota (JP); Naoki Iwasaki, Mobara (JP); Yoshihiro Imajo, Mobara (JP)

(73) Assignees: Panasonic Liquid Crystal Display Co., Ltd., Hyogo (JP); Hitachi Displays, Ltd., Chiba (JP)

( * ) Notice: Subject to any disclaimer, the term of this patent is extended or adjusted under 35 U.S.C. 154(b) by 486 days.

(21) Appl. No.: 12/388,607

(22) Filed: Feb. 19, 2009

(65) Prior Publication Data
US 2009/0213293 A1 Aug. 27, 2009

(30) Foreign Application Priority Data

Feb. 22, 2008 (JP) ................................. 2008-040799
Jul. 29, 2008 (JP) ................................. 2008-194852

(51) Int. Cl.
G02F 1/1333 (2006.01)
(52) U.S. Cl. .......................................................... 349/58
(58) Field of Classification Search ...................... 349/58
See application file for complete search history.

(56) References Cited

U.S. PATENT DOCUMENTS

| | | | | |
|---|---|---|---|---|
| 4,042,861 A | * | 8/1977 | Yasuda et al. | 361/783 |
| 6,067,133 A | * | 5/2000 | Niibori et al. | 349/60 |
| 6,847,415 B1 | * | 1/2005 | Yoshimura et al. | 349/58 |
| 2007/0046852 A1 | * | 3/2007 | Kim et al. | 349/58 |

FOREIGN PATENT DOCUMENTS

| | | |
|---|---|---|
| JP | 2007-183381 | 7/2007 |
| JP | 2007-184232 | 7/2007 |

* cited by examiner

Primary Examiner — Eric Wong
(74) Attorney, Agent, or Firm — Antonelli, Terry, Stout & Kraus, LLP.

(57) ABSTRACT

A liquid crystal display device is provided with a backlight where there is little inconsistency in the temperature in the fluorescent lamps and which can illuminate the liquid crystal panel well even when the structure is thin.

The liquid crystal display has a liquid crystal panel and a backlight for illuminating this panel, wherein when the side of the liquid crystal panel on which the backlight is placed is a rear side and the side which faces the backlight is a front side, the backlight has: a housing having a side with an opening; a number of fluorescent lamps in long tube form which are placed inside the housing; and a light source drive circuit with a coil which drives the number of fluorescent lamps, where the number of fluorescent lamps are placed at the bottom of a lower frame which forms the housing, the bottom of the lower frame has such a form that a recess towards the front side is provided at a predetermined location, the light source drive circuit is placed on the rear side of the lower frame and in a region in the recess towards the front side at the bottom of the lower frame, and a metal plate is provided between the rear side of the lower frame and the coil mounted in the light source drive circuit.

25 Claims, 21 Drawing Sheets light source drive circuit INVM light source drive circuit INVM

LIQUID CRYSTAL DISPLAY DEVICE

The present application claims priorities over Japanese Application JP2008-040799 filed on Feb. 22, 2008 and Japanese Application JP2008-194852 filed on Jul. 29, 2008, the contents of which are hereby incorporated into this application by reference.

BACKGROUND OF THE INVENTION (1) Field of the Invention

The present invention relates to a liquid crystal display device.

(2) Related Art Statement

In recent years, the use of light emitting type plasma display devices and non-light emitting type liquid crystal display devices has become more widespread instead of CRT's (cathode ray tubes).

From among these, liquid crystal display devices use liquid crystal panels as transmission type light modulation elements, and illumination devices (hereinafter referred to as backlight) are provided on the rear surface of the liquid crystal panels so that the liquid crystal panels are irradiated with light. In addition, the transmittance of light from the backlight is controlled in the liquid crystal panels so that an image is formed.

Liquid crystal display devices have one characteristic in that they can be thinly formed in comparison with CRT's, and in recent years, a thinner liquid crystal display device has been desired. Therefore, it has been requested to reduce the depth of the backlight that forms the liquid crystal display device. A backlight using EEFL's (external electrode fluorescent lamps) is disclosed in accordance with a technology relating to the backlight of such a liquid crystal display device in Patent Document 1, for example.

[Patent Document 1] Japanese Unexamined Patent Publication 2007-184232 (see Paragraph 0052)

EEFL's and CCFL's (cold cathode fluorescent lamps) are fluorescent lamps formed of long, thin tubes, and therefore a thin backlight can be provided using fluorescent lamps, such as EEFL's or CCFL's.

In sufficiently thin backlights (thickness is approximately ⅔ to ½) in comparison with conventional backlights, the fluorescent lamps are affected by heat emitting bodies, such as circuits, on the rear side of the backlight so that the inconsistency in temperature becomes greater in the longitudinal direction of the fluorescent lamps, and in some cases the emission of light becomes inconsistent.

SUMMARY OF THE INVENTION

An object of the present invention is to provide a liquid crystal display device with a backlight where there is little inconsistency in the temperature in the fluorescent lamps and which can illuminate the liquid crystal panel well even when the structure is thin.

In order to achieve the above described object, the present invention provides a structure having a liquid crystal panel and a backlight for illuminating this panel, wherein when the side of the liquid crystal panel on which the backlight is placed is a rear side and the side which faces the backlight is a front side, the backlight has: a housing having a side with an opening; a number of fluorescent lamps in long tube form which are placed inside the housing; and a light source drive circuit with a coil which drives the number of fluorescent lamps, where the number of fluorescent lamps are placed at the bottom of a lower frame which forms the housing, the bottom of the lower frame has such a form that a recess towards the front side is provided at a predetermined location, the light source drive circuit is placed on the rear side of the lower frame and in a region in the recess towards the front side at the bottom of the lower frame, and a metal plate is provided between the rear side of the lower frame and the coil mounted in the light source drive circuit.

In addition, the invention provides a structure having: a liquid crystal panel; and a backlight for illuminating the liquid crystal panel, wherein when the side of the liquid crystal panel on which the backlight is placed is a rear side and the side which faces the backlight is a front side, the backlight has: a housing having a side with an opening; a number of fluorescent lamps in long tube form which are placed inside the housing; and a light source drive circuit with a coil which drives the number of fluorescent lamps, where the number of fluorescent lamps are placed at the bottom of a lower frame which forms the housing, a diffusion plate which diffuses light is placed so as to cover the side with an opening of the lower frame, the bottom of the lower frame has such a form that the distance between the diffusion plate and the bottom is greater in the portions of the backlight in the vicinity of the two ends of the fluorescent lamps than in the center portion of the backlight, the light source drive circuit is placed on the rear side of the lower frame and in such a location that the distance between the diffusion plate and the bottom of the lower frame is smaller at the bottom of the lower frame than in the portion in the vicinity of the two ends of the fluorescent lamps, and a metal plate is provided between the rear side of the lower frame and the coil mounted in the light source drive circuit.

In addition, the invention provides a structure having: a liquid crystal panel; and a backlight for illuminating the liquid crystal panel, wherein the liquid crystal display device is provided with a number of structurally reinforcing frames in rod form made of a metal, when the side of the liquid crystal panel on which the backlight is placed is a rear side and the side which faces the backlight is a front side, the backlight has: a housing having a side with an opening; a number of fluorescent lamps in long tube form which are placed inside the housing; and a light source drive circuit with a coil which drives the number of fluorescent lamps, where the number of fluorescent lamps are placed in parallel at the bottom of a lower frame which forms the housing, the bottom of the lower frame has such a form that a recess towards the front side is provided at a predetermined location, the light source drive circuit is placed on the rear side of the lower frame and in a region in the recess towards the front side at the bottom of the lower frame, and there is a region where the structurally reinforcing frame does not make contact with the lower frame along a line in the longitudinal direction of the fluorescent lamps so as to correspond to the location of the coil in the light source drive circuit.

In addition, the invention provides a structure A liquid crystal display device, having: a liquid crystal panel; and a backlight for illuminating the liquid crystal panel, wherein the liquid crystal display device is provided with a number of coils, when the side of the liquid crystal panel on which the backlight is placed is a rear side and the side which faces the backlight is a front side, the backlight has: a housing having a side with an opening; a number of fluorescent lamps in long tube form which are placed inside the housing; and a light source drive circuit with a coil which drives the number of fluorescent lamps, where the number of fluorescent lamps are placed in parallel at the bottom of a lower frame which forms the housing, the bottom of the lower frame has such a form that a recess towards the front side is provided at a predetermined location, the light source drive circuit is placed on the rear side of the lower frame and in a region in the recess towards the front side at the bottom of the lower frame, and at least some coils from among the number of coils are provided along a line in the longitudinal direction of the fluorescent lamps so as to correspond to the location of the coil in the light source drive circuit.

The present invention can provide a liquid crystal display device with a backlight where there is little inconsistency in temperature in the fluorescent lamps and which can illuminate the liquid crystal panel well even when the structure is thin.

EXPLANATION OF SYMBOLS

Figure 1:
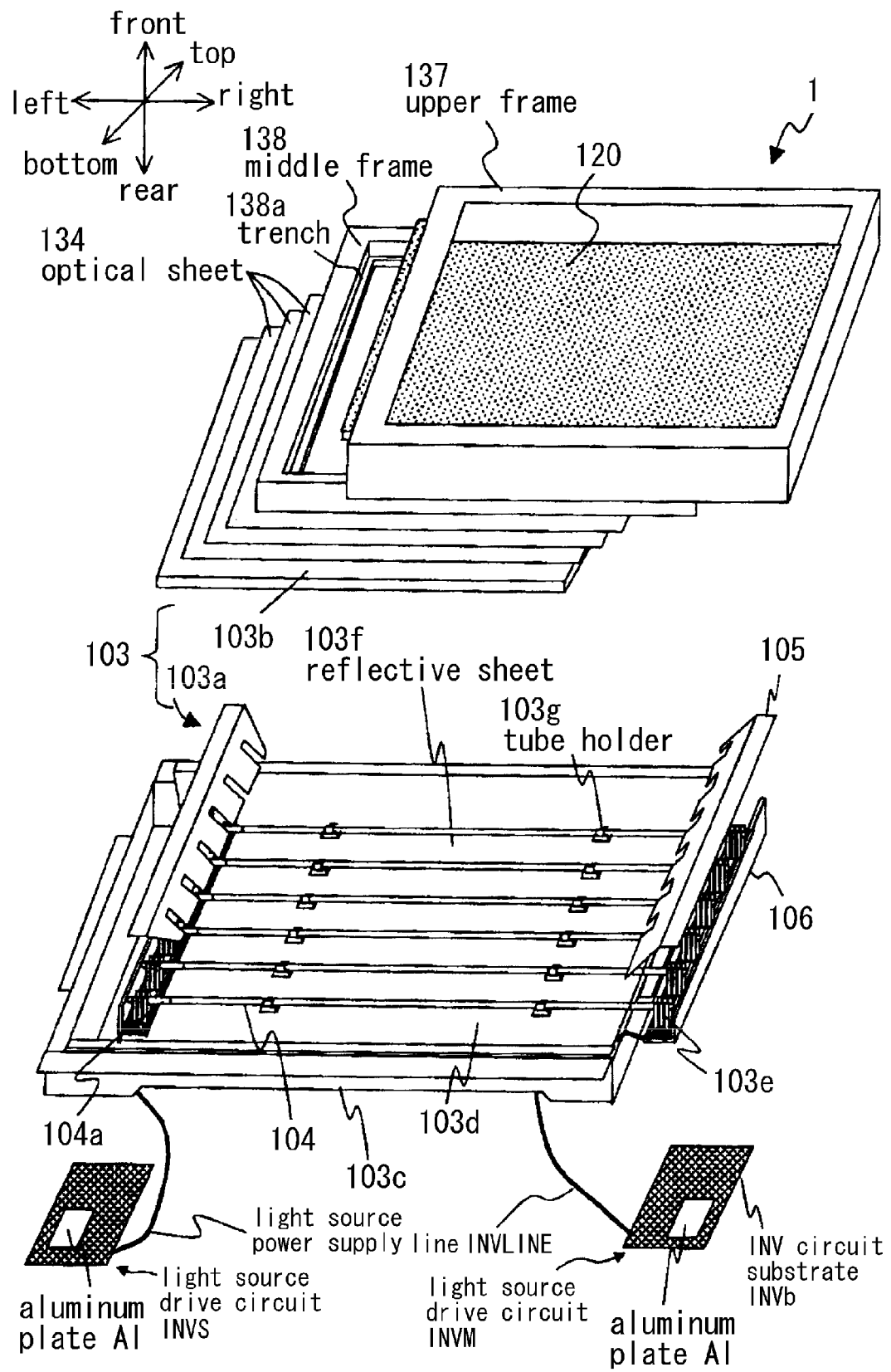
FIG. 1 is a perspective diagram showing the configuration of the liquid crystal display device according to the first embodiment of the present invention.

1 . . . liquid crystal display device
103 . . . backlight
103a . . . light source unit
103b . . . diffusion plate
103c . . . lower frame (housing)
103d . . . bottom
103e . . . electrode holder
104 . . . fluorescent lamp
104a . . . electrode
104b . . . light emitting portion
105 . . . upper side mold (cover member)
106 . . . lower side mold (insulating member)
105a . . . shield plate
120 . . . liquid crystal panel

THE PREFERRED EMBODIMENTS OF THE INVENTION

First Embodiment

In the following, the best mode for carrying out the present invention is described in detail in reference to appropriate drawings.

Figure 2A:
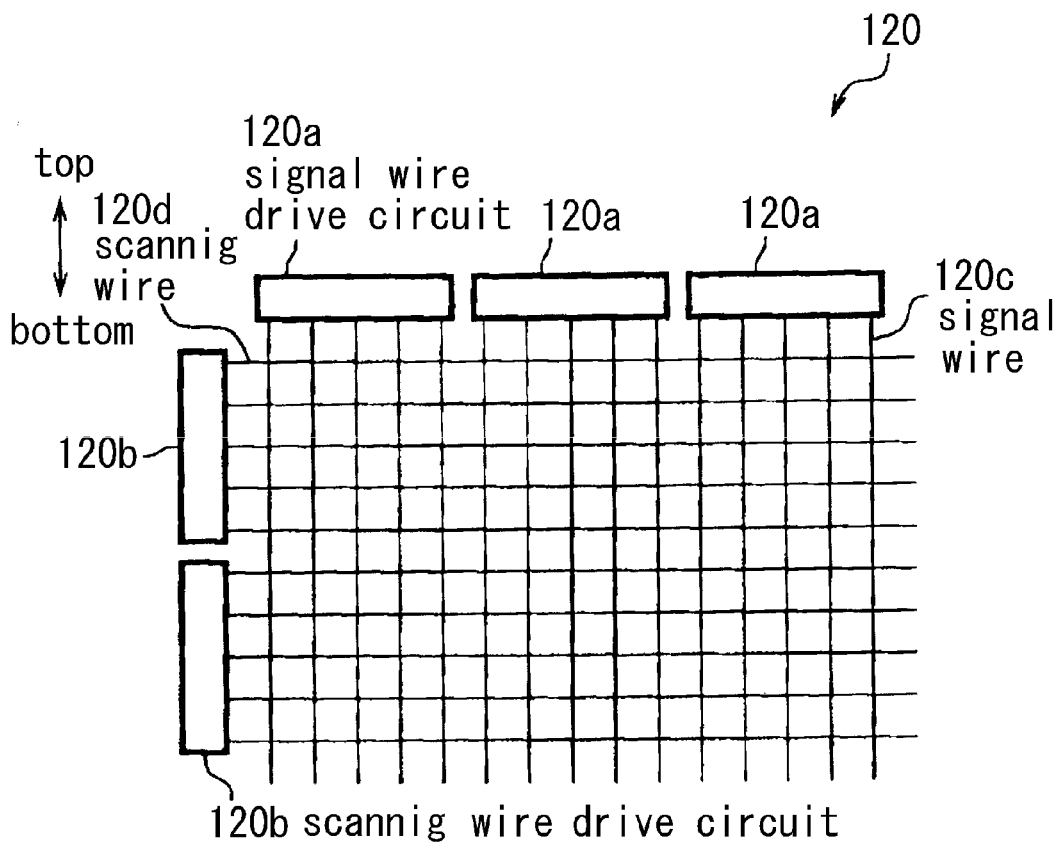
FIG. 2A is a diagram showing the wires of a liquid crystal panel and the arrangement of drive circuits.
Figure 2B:
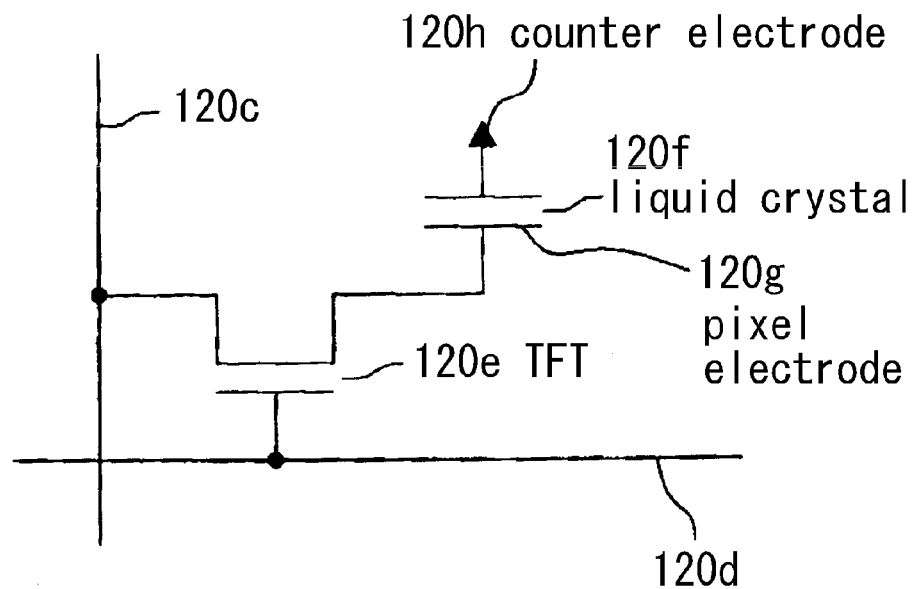
FIG. 2B is a diagram showing the arrangement of a TFT and a pixel electrode.
Figure 3A:
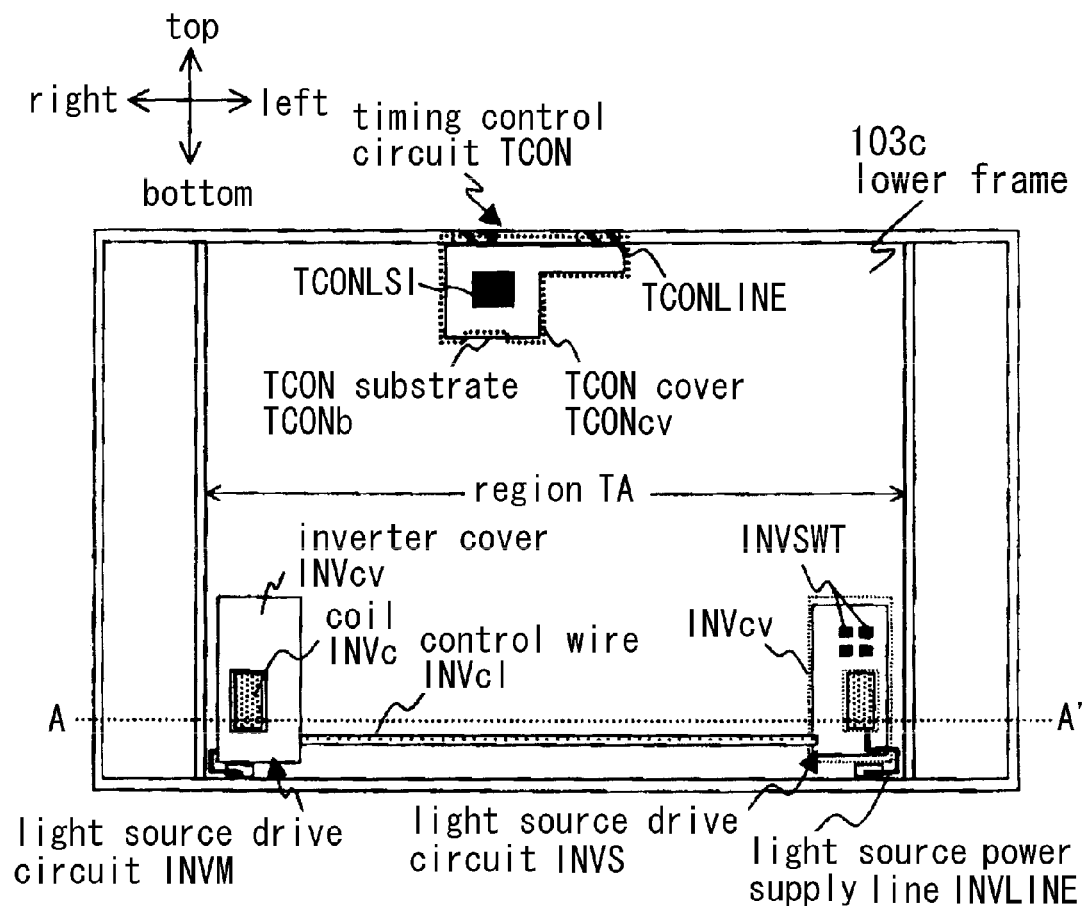
FIG. 3 is a diagram showing the configuration of the liquid crystal display device according to the first embodiment of the present invention.
Figure 3B:
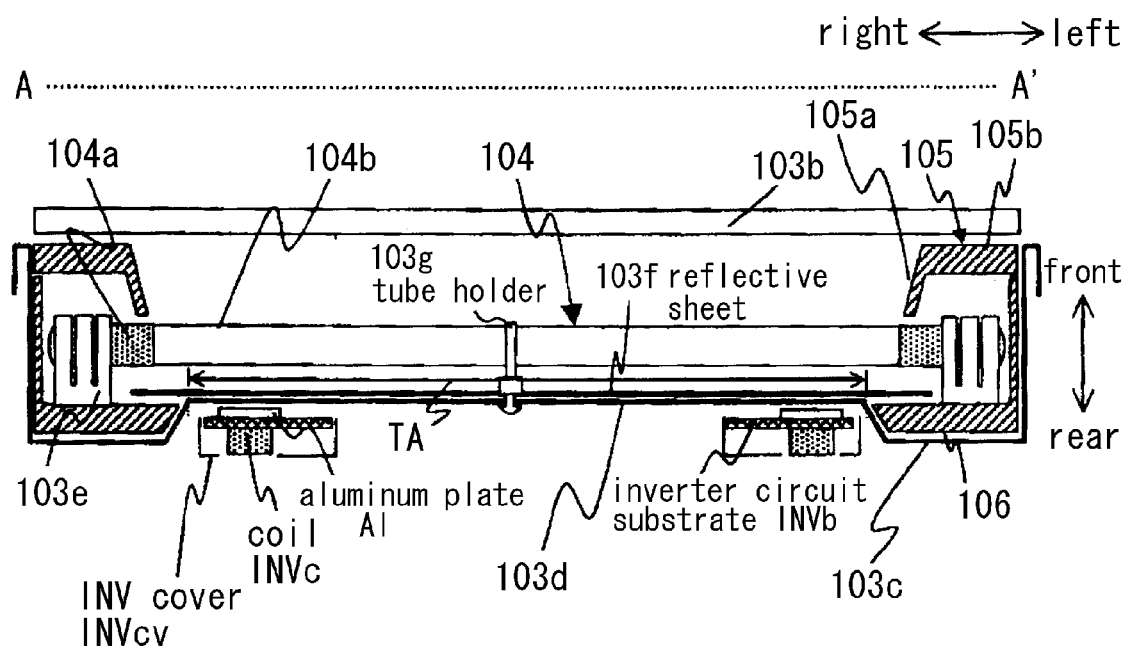

FIG. 1 is a perspective diagram showing the configuration of the liquid crystal display device according to the first embodiment, FIG. 2A is a diagram showing the wires of the liquid crystal panel and the arrangement of the drive circuit, and FIG. 2B is a diagram showing the arrangement of a TFT (thin film transistor) and a pixel electrode. FIG. 3A is a diagram showing the backlight as viewed from the rear, and FIG. 3B is a cross sectional diagram along line A-A' in FIG. 3A.

As shown in FIG. 1, top, bottom, left, right, front and rear are defined in reference to the display screen of the liquid crystal panel 120 in the description of the present invention.

As shown in FIG. 1, the liquid crystal display device 1 according to the first embodiment is formed so as to primarily include a liquid crystal panel 120 and a backlight 103. Thus, the liquid crystal display device 1 is formed so as to include an upper frame 137, a middle frame 138, an optical sheet 134 and the like.

Furthermore, the liquid crystal display device 1 is provided with a control device for controlling the liquid crystal display device 1 and a drive portion having a DC/DC power supply for supplying a power voltage to the backlight 103 and the like, though this is not shown. The control device is a device which controls the liquid crystal panel 120, the backlight 10 and the like, and carries out an image process on images displayed on the liquid crystal display device 1, formed so as to include a computer, not shown, having a CPU (central processing unit), a RAM (random access memory), a ROM (read only memory) and the like, programs and periphery circuits, for example, and is driven using programs stored in the ROM.

The upper frame 137 is made of a metal, such as iron or aluminum, placed in the front of the liquid crystal panel 120, and functions as a front cover for the liquid crystal display device 1. In addition, the upper frame 137 has such a form as to have an opening for the display area portion of the liquid crystal display device 1.

In addition, the middle frame 138 is made of a resin, placed in the rear of the liquid crystal panel 120, and functions to fix the liquid crystal panel 120. The middle frame 138 has an opening in the center portion, so that the backlight 103 provided in the rear can illuminate the liquid crystal panel 120, and a trench 138a is created around the opening.

The liquid crystal panel 120 is fit into the trench 138a in the middle frame 138. In addition, the upper frame 137 is fixed to a lower frame 103c so as to cover the middle frame and the like.

The backlight 103 is primarily formed of a light source unit 103a and a diffusion plate 103b. The diffusion plate 103b is made of a resin, for example acryl, so that light emitted from the fluorescent lamps 104 is diffused and reflected or diffused and transmitted.

The light source unit 103a is formed of the lower frame 103c having an opening on the front side where fluorescent lamps 104, such as EEFL's, are aligned in parallel in the longitudinal direction of the lower frame 103c, and provided with the diffusion plate 103b, so that the opening in the lower frame 103c is covered.

Here, the lower frame 103c is a member which functions as a housing for the light source unit 103a. The lower frame 103c is a member in shallow box shape having an opening on the front side, and a number of fluorescent lamps 104 (six in FIG. 3) are aligned at the bottom 103d, which faces the opening.

The material for the lower frame 103c is not limited, and the frame is formed by processing a metal plate, such as of iron, or through resin molding.

In addition, it is preferable for a reflective surface on which light easily reflects to be formed inside the lower frame 103c, so that light beams emitted by the fluorescent lamps 104 efficiently illuminate the front side, and a reflective sheet 103f is placed inside the lower frame 103c as described above.

Here, as the method for forming a reflective surface, a method for pasting the reflective sheet 103f or a method for applying a white or silver paint having a high reflectance may be used, for example.

In the present embodiment, the material for the lower frame 103c is iron. Iron is an inexpensive material which allows the housing of the light source unit to be strong against warping structurally, and iron is generally used as the material for the lower frame.

The fluorescent lamps 104 are turned on when power is supplied by light source drive circuits INVM and INVS (so-called inverters) provided on the left and right in the rear of the backlight 103. The light source power supply lines INVLINE are wires for supplying power to the fluorescent lamps from the light source drive circuits INVM and INVS.

In the present embodiment, an aluminum plate Al having a thickness of 0.3 mm is pasted on the surface of the INV circuit substrate INVb which faces the lower frame so as to correspond to the location of the coil provided in the light source drive circuit.

It becomes possible to prevent the temperature of the lower frame 103c from rising due to the magnetic field generated by the coil by pasting an aluminum plate Al so that it corresponds to the coil.

In the present embodiment, the aluminum plate Al, which is a metal plate, is pasted on the surface of the INV circuit substrate INVb which faces the lower frame instead of to the lower frame.

In the case where the aluminum plate Al is provided close to the above described coil, there is parasitic capacitance or a parasitic inductance between the aluminum plate and the above described aluminum coil, making the circuit constant of the above described coil different from in the case where the coil is placed in a vacuum. When the light source drive circuit is designed, the parasitic capacitance, parasitic inductance and the like when an aluminum plate Al is provided are taken into consideration for optimal design.

The rear of the lower frame is a surface of a flat metal plate having a large area (defined area having a diagonal of approximately 26 inches or more), and therefore, the lower frame warps as a whole or in certain portions. In the case where an aluminum plate Al is pasted to the lower frame, the distance between the aluminum plate Al and the above described coil is different depending on the state of the lower frame. That is to say, the distance between the aluminum plate Al and the above described coil is inconsistent.

Accordingly, the value of the parasitic capacitance and parasitic inductance between the aluminum plate Al and the above described coil varies. In the case where the circuit constant varies greatly, a large margin id necessary at the time of design, and thus the performance may lower. In particular, in the case where the maximum value of the output power has a large margin, the maximum brightness has a large margin, because the brightness of the liquid crystal panel has a relationship of monotonous inclination with the power.

That is to say, in the case where the potential brightness is 500 $cd/m^2$, the maximum brightness of the liquid crystal panel is lower than 500 $cd/m^2$, because the maximum power is lowered so as to have a margin.

In the case where the light source drive circuit is designed taking a margin of 10% into consideration under such conditions that the output power does not exceed 100 W, in order to prevent heat emission, for example, the value in the design for maximum output power is 90 W. In the case where a margin of 5% is taken into consideration, the value in the design for the maximum output power is 95 W.

Accordingly, in the case where it is desired for the power to increase under such conditions that the output power does not exceed 100 W, as described above, so that the brightness increases, the value in the design for the maximum output power can be made close to a predetermined desired value when the margin is smaller.

In the case where an aluminum plate Al, which is a metal plate, is pasted on the surface of the INV circuit substrate INVb which faces the lower frame instead of to the lower frame, as in the case of the present embodiment, the fluctuation in the value of the parasitic capacitance and the parasitic inductance between the aluminum plate Al and the above described coil is small in comparison with the case where the aluminum plate is pasted to the lower frame, and therefore, the margin to prevent inconsistency can be reduced.

In addition, the thinner the backlight is, the more the lower frame warps as a whole or in certain portions. This is because the lower frame becomes easy to twist as it becomes thinner.

Accordingly, the thinner the backlight is, the more important it becomes to paste an aluminum plate Al, which is a metal plate, on the surface of the INV circuit substrate INVb, which faces the lower frame.

In the present embodiment, the fluorescent lamps 104 are EEFL's. Here, the fluorescent lamps 104 are not limited to EEFL's, and may be other fluorescent lamps, such as CCFL's or HCFL's (hot cathode fluorescent lamps). In addition, though FIG. 1 shows six fluorescent lamps 104, there is no limitation to the number. In 32-inch liquid crystal panels 120, 16 to 20 fluorescent lamps, for example EEFL's or CCFL's, are required, and in the case where HCFL's are used, three to ten fluorescent lamps are necessary.

Lamp holders 103g are fixed inside the lower frame 103c. Portions of the reflective sheet 103f are sandwiched between the lamp holders 103g and the lower frame 103c, so that the reflective sheet 103f is fixed to the lower frame. Fluorescent lamps 104 are held by the lamp holders 103g so as to be fixed at a predetermined level relative to the reflective sheet 103f.

In addition, a lower side mold 106 is fixed to the lower frame 103c. Electrode holders 103e for holding electrodes 104a formed at the two ends of the fluorescent lamps 104 are fixed to the lower side mold 106. In addition, the diffusion plate 103b is secured to an upper side mold 105, which is provided so as to cover the lower side mold 106.

The reflective sheet 103f placed inside the lower frame 103c reflects and diffuses light emitted from the fluorescent lamps 104 efficiently toward the front side. Furthermore, the diffusion plate 103b provided on the front side of the lower frame 103c allows light from the fluorescent lamps 104 to transmit while diffusing and be reflected while diffusing. As a result, light emitted from the fluorescent lamps 104 repeats diffusion and reflection between the reflective sheet 103f and the diffusion plate 103b a number of times and is emitted through the diffusion plate 103b so as to enter the liquid crystal panel 120.

Here, light emitted from the diffusing plate 103b after repeating diffusion and reflection a number of times between the reflective sheet 103f and the diffusion plate 103b is controlled by a number of optical sheets 134 (three in FIG. 1) provided on the front side of the diffusion plate 103b, in terms of the diffusion properties and the directivity.

The optical sheets 134 are placed in the rear of the middle frame 138 and function to provide directivity to light emitted from the backlight 103, in order to increase the uniformity within a plane or increase the brightness toward the front.

The number of optical sheets 134 is not limited. In FIG. 1, three optical sheets 134 are shown.

The thus formed backlight 103 is provided in the rear of the liquid crystal panel 120, and functions to illuminate the liquid crystal panel 120 from the rear.

The liquid crystal panel 120 has a structure where liquid crystal is sandwiched between two glass substrates, and functions as an optical shutter which controls transmission and blocking of light emitted from the backlight 103 when the liquid crystal molecules that form the liquid crystal are controlled, in terms of the orientation.

As shown in FIG. 2A, signal wires 120c and scanning wires 120d are wired in lattice form in the liquid crystal panel 120 provided with signal wire drive circuits 120a for driving signal wires 120c and scanning wire drive circuits 120b for driving scanning wires 120d.

In addition, as shown in FIG. 2B, TFT's 120e for controlling the liquid crystal 120f are connected at intersections between signal wires 120c and scanning wires 120d. The TFT's 120e electrically connect the signal wire 120c and the pixel electrode 120g when a positive voltage is applied to the scanning wire 120d.

At this time, a voltage corresponding to image data is applied to the pixel electrode 120g from the signal wire 120c so that the shutter of the liquid crystal 120f opens or closes in accordance with the voltage between the pixel electrode 120g and the counter electrode 120h. When the shutter of the liquid crystal 120f opens, light emitted from the backlight 103 shown in FIG. 1 transmits and makes the pixel bright. In the case where the shutter of the liquid crystal 120f is not open, the pixel becomes dark.

The relationship between the opening or closing of the shutter of the liquid crystal 120f and the voltage applied to the liquid crystal (≈ voltage between pixel electrode 120g and counter electrode 120h) depends on the so-called display mode of the liquid crystal 120f. In an example of a liquid crystal panel 120 for general television receivers in display mode, pixels become bright when the absolute value of the voltage applied to the liquid crystal 120f is great (approximately 5 V) and pixels become dark when the absolute value is small (approximately 0 V).

At this time, the greater the absolute value of the voltage is, the brighter the pixel becomes, though not linearly, between 0V and 5 V. In addition, the brightness of the display can be changed by using different voltages between 0 V and 5 V. The present invention does, of course, not have any limitations in terms of the display mode.

In addition, in the case where a negative voltage is applied to the scanning wire 120d connected to a TFT 120e, the connection between the signal wire 120c and the pixel electrode 120g becomes of a high resistance, so that the voltage applied to the liquid crystal 120f remains the same.

Thus, the liquid crystal 120f is controlled when a voltage is applied to the scanning wires 120d and the signal wires 120c in the configuration.

The scanning wire drive circuits 120b function to scan from the top to the bottom in sequence, for example, at constant intervals, by applying a predetermined voltage to each scanning wire 120d. In addition, the signal wire drive circuits 120a apply a voltage corresponding to the pixel connected to the scanning wire 120d to which a scanning wire drive circuit 120b applies a predetermined voltage to the signal wire 120c.

In this configuration, bright pixels and dark pixels can be set by means of the scanning wires 120d to which a voltage is applied. In addition, Bright pixels and dark pixels can be set for pixels connected to all of the scanning wires by controlling the voltage applied to the respective signal wires 120c by the signal wire drive circuits 120a as the scanning wire drive circuits 120d scan, and thus, an image can be formed on the liquid crystal panel 120.

Here, the signal wire drive circuits 120a and the scanning wire drive circuits 120b may be controlled by a timing control circuit TCON provided with the liquid crystal display device for example in the configuration (see FIG. 3A).

The liquid crystal panel 120 functions to manage image signals for the display as information on the brightness (information on gradation) for the liquid crystal 120f in each pixel (see FIG. 2B). In addition, the scanning wire drive circuits 120b may be controlled to scan so that a predetermined voltage is applied to one of the scanning wires 120d from the top to the bottom in sequence, and at the same time, the signal wire drive circuits 120a may be controlled so that a predetermined voltage is applied to each signal wire 120c corresponding to the information on the brightness (information on gradation) for the signal wire 120c connected to the TFT 120e to which the scanning wire 120d to which the predetermined voltage is applied is connected in the configuration.

FIG. 3A is a diagram showing the thin backlight according to the present embodiment as viewed from the rear. FIG. 3B is a cross sectional diagram along the dotted line A-A' in FIG. 3A. Upper side molds 105 are fixed at the two ends, left and right, inside the lower frame 103c by means of screws, for example.

The upper side molds 105 are members formed of a resin, for example, and have an upper surface portion 105b which is parallel to the bottom 103d of the lower frame 103c (though the reflective sheet 103f is omitted in some of the figures, the bottom 103d of the lower frame 103c is covered with the reflective sheet 103f), and a shield plate 105a formed so as to decline from the upper surface portion 105b toward the bottom 103d of the lower frame 103c.

The light source drive circuits INVM and INVS are formed of a number of circuit parts arranged on the inverter circuit substrate INVB. Parts which emit a great amount heat and primarily relate to the present invention in the light source drive circuits INVM and INVS are a coil INVc and a switching transistor INVSWT.

The light source drive circuits INVM and INVS are covered with an inverter cover INVcv made of iron. Only the form of the cover is shown, by the dotted line, so that the inside of the inverter cover INVcv is shown in the light source drive circuit INVS on the left. In the inverter cover INVcv, the surface that faces the coil INVc is a window, and not covered.

The light source drive circuits INVM and INVS arranged on the left and right are driven in sync, and the wire through which a signal for synchronization is sent is a control wire INVc1.

A timing control circuit TCON for controlling the signal wire drive circuits 120a and the scanning wire drive circuits 120b is provided in the upper end portion at the center. The timing control circuit TCON is covered with a TCON cover TCONcv made of iron. The figure shows the schematic form with a dotted line.

The timing control circuit TCON is formed of a number of circuit parts provided on a TCON substrate TCONb. The part which emits a great amount of heat and primarily relates to the present invention is TCONLSI for carrying out an arithmetic process on image data in the timing control circuit TCON.

Figure 4A:
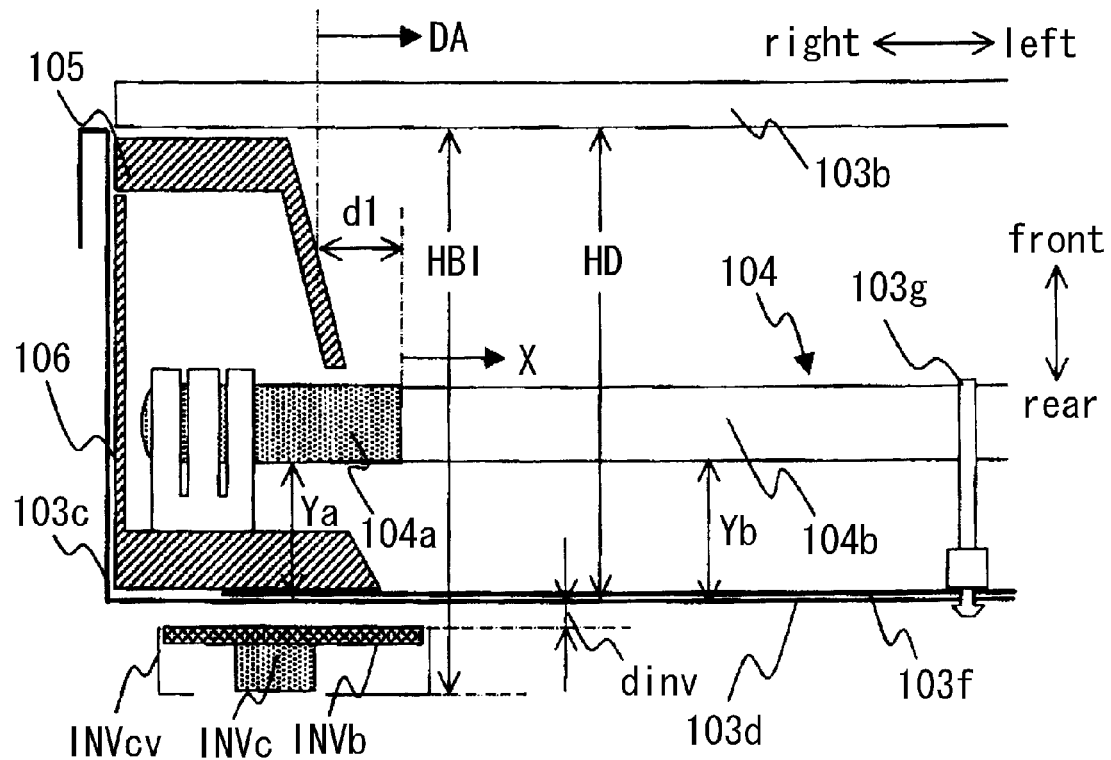
FIGS. 4A and 4B are diagrams illustrating the object of having a thin backlight.
Figure 4B:
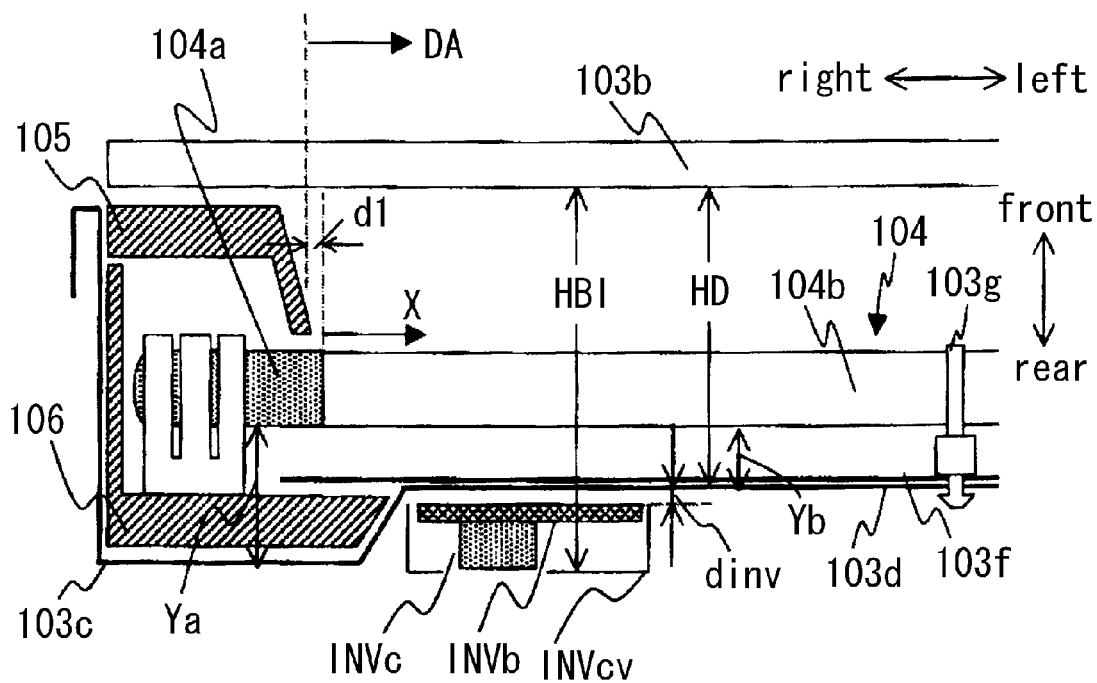

FIGS. 4A and 4B are diagrams illustrating the object of the present invention in more detail. FIG. 4A is a diagram showing a conventional, thick backlight. FIG. 4B is a diagram showing a thin backlight to which the present invention is applied. The two are compared in the detailed description.

In the configuration of the convention, thick backlight shown in FIG. 4A, the diffusion distance HD (distance of space between light diffuses in direction of thickness) between the lower frame 103c (bottom 103d) and the diffusion plate 103b is approximately 20 mm, and the distance HBI between the rear side of the inverter cover INVcv and the diffusion plate 103b is approximately 35 mm to 50 mm.

The above described diffusion distance HD in the case of the thin backlight shown in FIG. 4B if approximately 10 mm, and the above described distance HBI is approximately 15 mm to 25 mm.

In addition, in the conventional, thick backlight shown in FIG. 4A, the distance Yb between the lower frame 103c and the rear side of the light emitting portion 104b, as well as the distance Ya between the lower frame 103c and the rear side of the electrodes 104a, are the same, and approximately 3 mm to 5 mm.

Meanwhile, in the thin backlight shown in FIG. 4B, the distance Ya and the distance Yb are different because the thickness is reduced, and the distance Ya is approximately 3 mm to 5 mm, which is the same as in the conventional, thick backlight, while the distance Yb is smaller than in the conventional, thick backlight.

The above described distance Yb is approximately 1 mm to 2 mm. The reason why the distance Ya is approximately the same as in the conventional, thick backlight is that when the lower frame 103c made of iron is in the vicinity of the electrode 104a, the capacitance between the electrode 104a and the lower frame 103c increases, thus affecting the properties of the system for turning on the fluorescent lamps 104.

That is to say, the distance Ya remains approximately the same as in the conventional, thick backlight, and thus, the properties for turning on the lamps can be prevented from being affected by the reduction in the thickness.

In the case of the thin backlight shown in FIG. 4B, the lower frame 103c is bent at a point approximately 10 mm to 100 mm from the border between the electrode 104a and the light emitting portion 104b toward the center (toward the left-right center; direction x in figure), and the distance Yb between the lower frame 103c and the rear side of the light emitting portion 104b is approximately 1 mm to 2 mm.

Accordingly, the region where the lower frame 103c has a recess on the front side and the distance Yb is approximately 1 mm to 2 mm is a region where the light emitting portion 104b is easily affected by the inconsistency in the temperature of the lower frame 103c as viewed from the rear of the lower frame 103c (region denoted by TA in FIGS. 3A and 3B; hereinafter referred to as region TA).

Accordingly, the thin backlight shown in FIG. 4B has a configuration where the light emitting portion 104b is easily affected by the inconsistency in the temperature of the lower frame 103c, because the distance Yb is small.

In addition, in the conventional, thick backlight shown in FIG. 4A, the light source drive circuits INVM and INVS are provided at the left and right ends (right end in FIG. 4A) in order to reduce the distance between the electrode holder 103e and the light source drive circuit, so that the light source power supply line INVLINE is short.

It is possible to place the coil INVc provided in the above described light source drive circuit in the vicinity of the electrode 104a, so that the light source drive circuits can be provided at the left and right ends, and thus, the coil is placed in such a position as to face the electrode 104a with the lower frame 103c in between.

Meanwhile, in the thin backlight shown in FIG. 4B, the light source drive circuits INVM and INVS are placed in the above described region TA in order to reduce the thickness. Accordingly, the light source drive circuits INVM and INVS are closer to the light emitting portion 104b at least by the amount by which the distance Yb is smaller, in comparison with in the conventional, thick backlight in FIG. 4A, and thus, the light emitting portion is affected more by the above described light source drive circuits.

Figure 5:
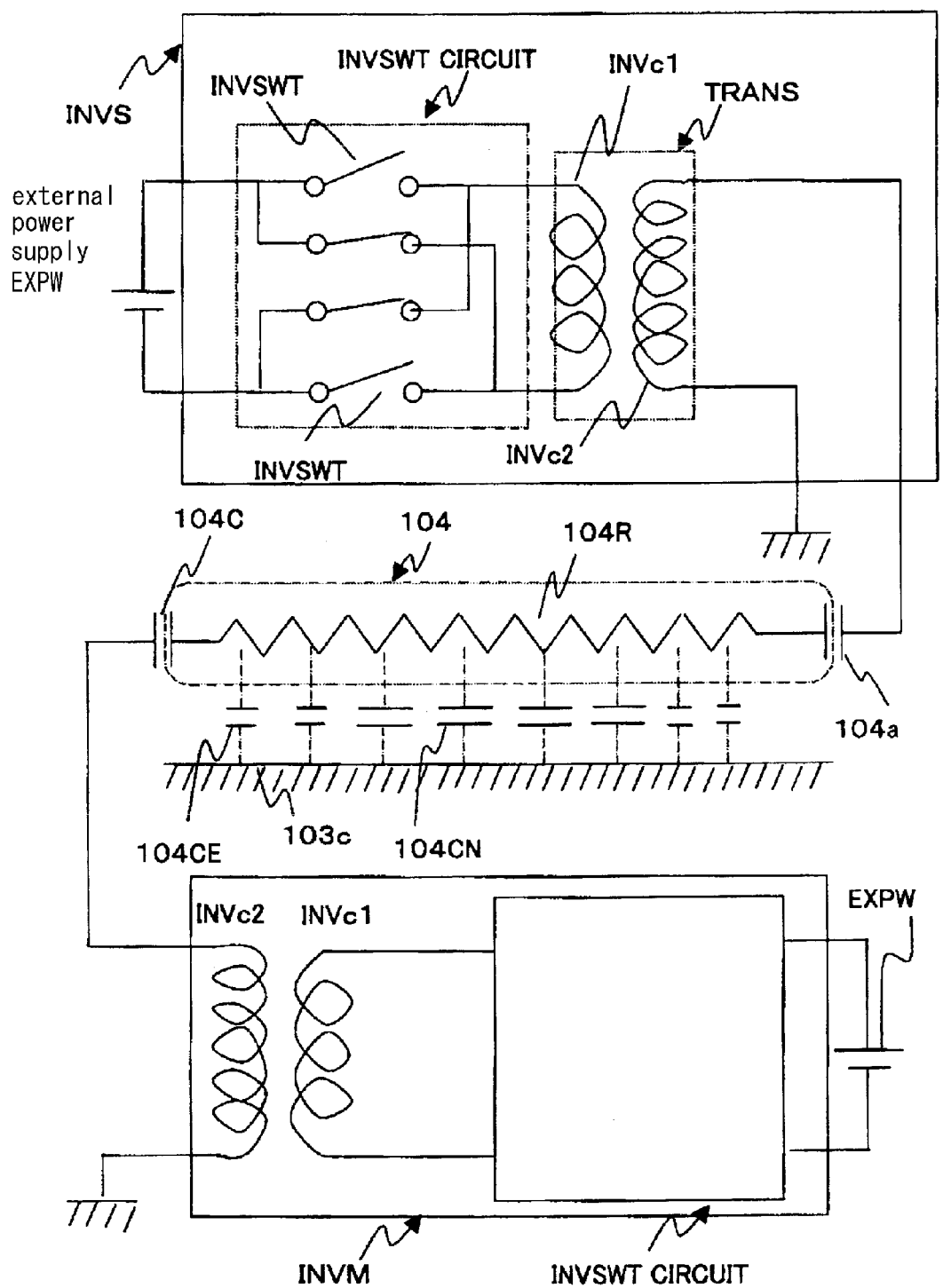
FIG. 5 is a circuit diagram showing the light source drive circuit and an EEFL.

Here, the coil INVc and the switching transistor INVSWT, which are primarily heat emitting parts in the light source drive circuits INVM and INVS, are described in reference to FIGS. 5A and 5B. FIGS. 5A and 5B shows a circuit example of a light source drive circuit in the case where EEFL's are used as fluorescent lamps. Only parts which primarily relate to the present invention are schematically shown.

A simplified fluorescent lamp 104 is shown using a resistor and capacitors (region surrounded by dotted line). The plasma within the fluorescent lamp when it is turned on is shown as a resistor 104R. The electrode 104a and the plasma within the fluorescent lamp with a glass tube in between form a capacitor 104C.

In addition, the plasma within the fluorescent lamp forms a parasitic capacitance together with the lower frame 103c. The lower frame 103c and the light emitting portion 104b in the vicinity of the electrode form a parasitic capacitance 104CE of which the value is determined by the distance Ya, and the light emitting portion 104b within the region TA forms a parasitic capacitance 104CN of which the value is determined by the distance Yb.

The parasitic capacitance 104CN is greater than the parasitic capacitance 104CE, so that Ya>Yb.

The light source drive circuits INVM and INVS are provided with a full bridge type switching circuit INVSWTCIRCUIT (there are, of course, cases where half bridge type is used).

The above described switching circuit is provided with four switching transistors INVSWT. A constant voltage is inputted into the switching circuit INVSWTCIRCUIT from an external power supply EXPW.

The transformer TRANS formed of a primary coil INVc1 and a secondary coil INVc2 boosts the voltage inputted into the primary coil INVc1, so that an output is gained from the secondary coil INVc2. The output voltage of the secondary coil is applied to the electrode 104a of the fluorescent lamp 104.

In addition, the switching circuit INVSWTCIRCUIT is controlled so that the output voltage from the secondary coil INVc2 provided with the light source drive circuit INVM and the output voltage from the secondary coil INVc2 provided with the light source drive circuit INVS are in alternating current wave form in opposite phases (approximately sine waves).

Accordingly, a voltage two times higher than the output voltage of the secondary coil INVc2 is applied across the electrodes 104a at the two ends of the fluorescent lamp 104.

It was found through experiment that the temperature is higher in the switching transistor INVSWT than in the primary coil INVc1 and the secondary coil INVc2.

However, the temperature of the lower frame 103c is higher in the portion that faces the above described transformer TRANS on which the above described coils are mounted, and the temperature of the fluorescent lamp is locally higher in a portion that faces the transformer TRANS.

Accordingly, the above described transformer TRANS mostly affects the temperature of the lower frame in the light source drive circuits INVM and INVS.

The reason for this is that the coil INVC mounted in the light source drive circuits INVM and INVS heats the lower frame 103c made of iron through electromagnetic induction (so-called induction heating), and thus makes the inconsistency in temperature in the fluorescent lamp greater.

The magnetic field generated by the coil INVc generates an eddy current in the lower frame 103c through electromagnetic induction, so that the lower frame 103c is directly heated. Heat emitted from the coil INVc is conveyed through the air at the same time as induction heating and, needless to say, heats the lower frame 103c made of iron.

The lower frame 103c emits heat through electromagnetic induction, and therefore, the temperature of the light emitting portion 104b which is close to the lower frame easily rises. The lower frame 103c emits heat as a result of a local eddy current under the influence of the coil INVc, and thus, the light emitting portion 104b is locally heated, and the temperature in the portion of the light emitting portion 104b becomes high.

The reason why light emission is affected by the inconsistency in temperature relates to the inconsistency in the density of mercury within the fluorescent lamp. The temperature becomes inconsistent in the light emitting portion 104b. The density of the mercury becomes inconsistent in the direction of the tube axis (longitudinal direction of fluorescent lamp), making light emission uneven.

Here, the degree to which the lower frame is affected depends on the distance between the lower frame 103c and the above described transformer TRANS (coil INVc).

In the case where the rear side of the above described transformer TRANS is at a distance of approximately 4 mm from the lower frame 103c and the inverter circuit substrate INVb provided with the above described transformer TRANS is at a distance of approximately 2 mm from the lower frame 103c (dinv=2 mm in FIG. 4), the lower frame 103c is affected.

In the case where the above described transformer TRANS is at a distance of approximately 10 mm from the lower frame 103c, however, the effects of the fluorescent lamp (lower frame) become significantly smaller. The degree of the effects is reduced by half.

In the thin backlight shown in FIG. 4B, the above described transformer TRANS is placed at a distance of approximately 4 mm from the lower frame 103c in order to reduce the thickness. Thus, the lower frame 103c is heated through induction by the magnetic field which leaks from the above described transformer TRANS.

Next, the results of measurement of the effects on the fluorescent lamp when the above described distance Yb is reduced are described. In the experiments, the maximum difference in temperature on the rear side of light emitting portion 104b was measured, so that the effects could be measured when the distance between the light emitting portion 104b and the lower frame 103c was reduced.

The measured fluorescent lamp 104 was placed so as to partially face the above described transformer TRANS. The transformer TRANS for the backlight in the experiment was placed so that the rear side of the above described TRANS was at a distance of approximately 4 mm from the lower frame 103c.

When the maximum difference in temperature in the light emitting portion 104b in the conventional, thick backlight shown in FIG. 4A, where the distance Ya=Yb=4.6 mm, is $\Delta T0$, and the maximum difference in temperature in the light emitting portion 104b in the thin backlight shown in FIG. 4B, where the distance Ya=4.6 mm and Yb=1.6 mm, is $\Delta T1$, $\Delta T0/\Delta T1 \approx 0.45$.

In the case of the above described conventional, thick backlight, the temperature became maximum in the light emitting portion 104b in the vicinity of the electrode 104a and the temperature sharply dropped as the distance from the electrode 104a became greater, and the temperature of the light emitting portion 104b in a portion approximately 5 cm to 6 cm from the electrode was almost the same as the lowest temperature.

Meanwhile, the portion of the light emitting portion 104b, where the temperature was the highest in the above described thin backlight, almost faced the above described transformer TRANS.

The above described transformer TRANS was located approximately 7 cm from the end of the electrode in the direction of the tube axis (direction x) (x=7 cm), and therefore, the temperature was continuously high between the light emitting portion 104b in the vicinity of the electrode 104a and a location facing the above described transformer TRANS, and the temperature lowered as the distance from the portion facing the above described transformer TRANS became greater. The temperature of the light emitting portion 104b in the vicinity of the electrode 104a rose under the influence of the above described transformer TRANS.

Accordingly, the problem with the temperature becoming inconsistent in the fluorescent lamp, and thus light emission became uneven, persisted only when the light source drive circuits INVM and INVS were placed closer to the lower frame 103c or the light emitting portion 104b was placed closer to the lower frame 103c in order to reduce the thickness, and the problem could not be examined in the conventional, thick backlight shown in FIG. 4A.

It is possible to solve the above described problem by inserting a metal plate between the above described transformer TRANS (coil INVc) and the lower frame 103c so that the magnetic field is blocked. Hereinafter, the above described metal plate is referred to as shield metal.

FIG. 3 shows an example where an aluminum plate Al having a thickness of 0.3 mm is used as the above described shield metal. The aluminum plate is pasted with double-sided adhesive tape. Aluminum and copper have lower electrical resistance than iron, and therefore, less heat is emitted due to the eddy current.

In addition, when the magnetic field energy is not converted to heat, the efficiency of the power of the above described transformer TRANS increases.

Furthermore, when the above described shield metal is placed over a large area so as to cover the surface facing the above described transformer TRANS, heat that would be transmitted to the lower frame 103c through the air from the above described transformer TRANS and periphery parts can be blocked. In particular, it becomes possible to lower the temperature by dispersing heat through the aluminum plate because aluminum and copper have low thermal resistance.

Accordingly, it is desirable to use aluminum or copper for the above described shield metal, from the point of view of heat dispersion.

When an aluminum plate is pasted to the inverter circuit substrate INVb in the thin backlight shown in FIG. 4B in a location facing the above described transformer using double-side adhesive tape, $\Delta T2/\Delta T1 \approx 0.45$, where $\Delta T2$ is the maximum difference in temperature in the light emitting portion 104b.

When an aluminum plate is pasted, the difference in temperature in the light emitting portion 104b that faces the above described transformer becomes almost zero, and becomes approximately the same as the maximum difference in temperature ΔT0 in the light emitting portion 104b in the conventional, thick backlight shown in FIG. 4A.

As described above, the present invention is characterized by having a structure where the number of fluorescent lamps are placed at the bottom of a lower frame which forms the housing, the bottom of the lower frame has such a form that a recess towards the front side is provided at a predetermined location, the light source drive circuit is placed on the rear side of the lower frame and in a region in the recess towards the front side at the bottom of the lower frame, and a metal plate is provided between the rear side of the lower frame and the coil mounted in the light source drive circuit.

That is to say, the light source drive circuit is placed on the rear side of the lower frame and in a location where the distance between the diffusion plate and the bottom of the lower frame is smaller than the portion of the fluorescent lamp in the vicinity of the two ends at the bottom of the lower frame, and a metal plate is provided between the rear side of the lower frame and the coil mounted in the light source drive circuit.

Here, the effects of preventing the temperature of the light emitting portion 104b that faces the above described transformer from rising by providing the above described metal plate between the rear side of the lower frame 103c and the coil mounted in the above described light source drive circuit are not necessarily limited to those gained as a result of there being a recess toward the front at the bottom of the lower frame.

Even in the case where the entire surface at the bottom of the lower frame is flat (Ya=Yb in FIG. 4), it becomes important in the sufficiently thin backlight (having a thickness of approximately ⅔ to ½) in comparison with conventional backlights to have the above described metal plate provided between the rear side of the lower frame 103c and the coil mounted in the above described light source drive circuit, as in the case where the bottom of the lower frame has a recess toward the front side.

This is because the distance between the rear surface of the lower frame and the rear side of the above described transformer TRANS is approximately 4 mm or less (corresponding to case of dinv=2 mm to 3 mm as in FIG. 4; distance between above described lower frame and above described coil is approximately 4 mm, even when dinv=3 mm in case where substrate is thin), or the light emitting portion 104b is placed closer to the lower frame 103c (in order to make the distance between the rear side of the light emitting portion 104b and the lower frame approximately 2 mm or less) in order to reduce the thickness.

In particular, in the case where the fluorescent lamps are CCFL's, the electrodes 104a are within the fluorescent lamps, and therefore, the effects of the parasitic capacitance 104 CE between the above described electrodes 104a and the lower frame on the operation of the panel become small, and thus, the entire surface at the bottom of the lower frame is sometimes made flat.

In addition, as in the case of the present embodiment, the above described metal plate is pasted to the surface of the INV circuit substrate INVb that faces the lower frame, fluctuation is prevented in the value of the parasitic capacitance and the parasitic inductance between the above described metal plate and the above described coil, and these effects are not limited to those gained by there being a recess toward the front at the bottom of the lower frame.

Second Embodiment

In the following, the best mode for carrying out the present invention is described in detail in reference to FIG. 6.

Figure 6A:
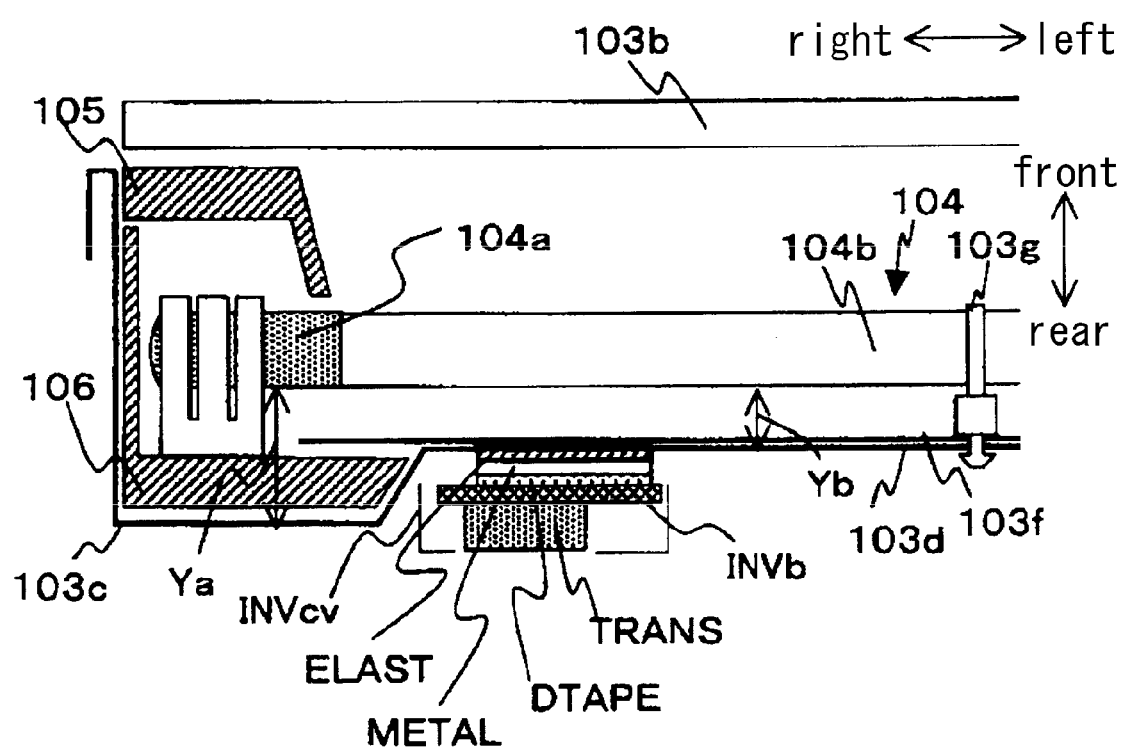
FIGS. 6A to 6C are diagrams showing the thin backlight and the light source drive circuits according to the second embodiment of the present invention.
Figure 6B:
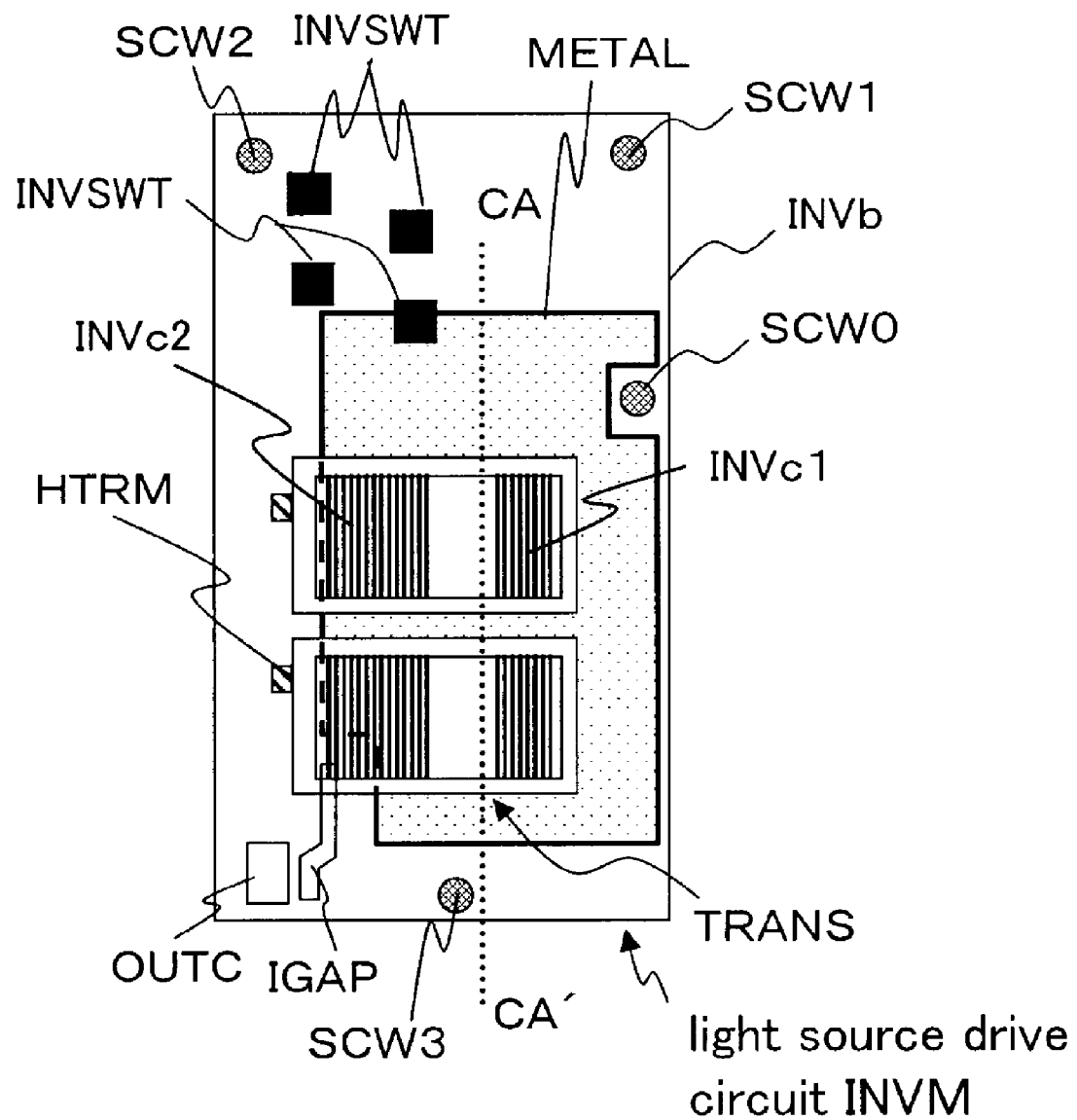
Figure 6C:
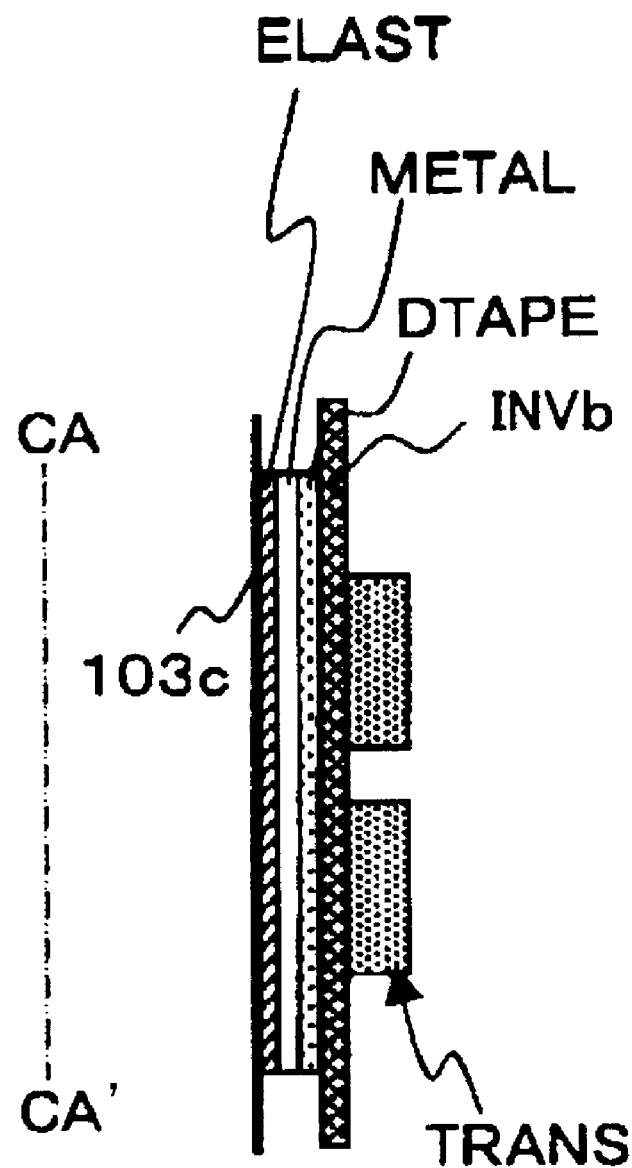

FIG. 6A is a cross sectional diagram showing the thin backlight according to the second embodiment. FIG. 6B is a diagram showing the light source drive circuit INVM according to the second embodiment. FIG. 6C is a cross sectional diagram along line CA-CA' in FIG. 6B. Here, the configuration of the liquid crystal display device 1 is the same as in the first embodiment (see FIG. 3), except in the light source drive circuit INVM shown in the figure (including its components, the shield metal and the parts for fixing the shield metal), and therefore, the description thereof is omitted.

When the shield metal METAL is placed so as to face the transformer TRANS, the shield metal METAL may vibrate and emit sound. In particular, in the case where the shield metal METAL is aluminum, the sound is significant. Measures against such sound are a problem with the arrangement of the shield metal. Furthermore, it is important to fix a shield metal which will not come off even after several years of use.

FIG. 6 is a diagram for illustrating the invention, which allows for preventing the shield metal from coming off, as well as measures against sound.

FIG. 6 is described below. In the configuration shown in FIG. 6, the shield metal METAL is pasted to the inverter circuit substrate INVb using double-sided adhesive tape DTAPE, so that an elastic body ELAST, such as of rubber, is sandwiched between the shield metal METAL and the lower frame 103c.

In the present embodiment, the thickness of the double-sided adhesive tape is 1 mm, the shield metal METAL is aluminum and has a thickness of 0.3 mm, and the thickness of the elastic body ELAST is 1 mm.

Various types of rubber, such as acryl based rubber and ethylene propylene based rubber, are possible as the elastic body ELAST. In addition, heat insulating sheets and multi-layer bodies of heat insulating sheets having elasticity can also be used. There are no particular limitations, as long as the space between the shield metal METAL and the lower frame 103c is filled in with the material so that the material makes close contact with the two. Materials which can make close contact with the two are referred to as elastic bodies. It is more preferable for the two sides of the elastic body ELAST to be adhesive.

The inverter circuit substrate INVb is fixed with screws (SCW0, SCW1, SCW2, SCW3) at the ends. The elastic body ELAST works to make the shield metal METAL make close contact with the inverter circuit substrate INVb via the double-sided adhesive tape DTAPE through the elastic force when compressed between the shield metal METAL and the lower frame 103c.

It is known that the above described sound can be suppressed when the shield metal METAL makes close contact with the inverter circuit substrate INVb. In addition, when the shield metal METAL is mechanically held with the elastic body ELAST in between, effects of preventing the metal from coming off can also be gained. The effects of the measures against sound and preventing the metal from coming off are not limited to those gained when there is a recess toward the front at the bottom of the lower frame.

In FIG. 6B, the output terminal OUTC is a terminal to which the light source power supply line INVLINE is connected, which supplies power to the fluorescent lamp 104. There is a gap IGAP for isolating a high voltage portion from a low voltage portion in the inverter circuit substrate INVb.

In addition, the transformer TRANS is provided with a high voltage terminal HTRM which leads out from the secondary coil INVc2. A voltage of several hundred V to approximately 1 kV relative to the ground GND is outputted from this terminal.

The pasted shield metal METAL (region surrounded by black line and dotted black line) has such a form as to avoid the high voltage terminal HTRM and face the middle portion between the primary coil INVc1 and the secondary coil INVc2. The high voltage terminal HTRM is avoided in order to keep a certain distance between the shield metal METAL and the high voltage terminal HTRM, so that the shield metal METAL is isolated from the high voltage terminal HTRM. The effects of isolation due to the above described form are not limited to those gained when there is a recess toward the front at the bottom of the lower frame.

The shield metal has such a form as to face the middle portion between the primary coil INVc1 and the secondary coil INVc2 because the middle portion between the primary coil INVc1 and the secondary coil INVc2 is one of the portions where the magnetic flux leaks and the lower frame 103c is heated the most through induction heating.

In addition, the pasted shield metal METAL is placed so as to face also the switching transistor INVSWT. This is in order to prevent radiation from the switching transistor INVSWT from reaching the lower frame 103c, as well as thermal transmission through the air. Heat disperses within the sheet metal METAL, and therefore, the temperature in the periphery of the switching transistor INVSWT also lowers.

It has been confirmed through experiment that even when a shield metal is placed so as to face only the switching transistor INVSWT closest to the transformer TRANS, as in the figure, the temperature of the light emitting portion 104b which faces the switching transistor INVSWT farthest away from the transformer TRANS lowers by 1° C. to 2° C.

<Modification>

Figure 7A:
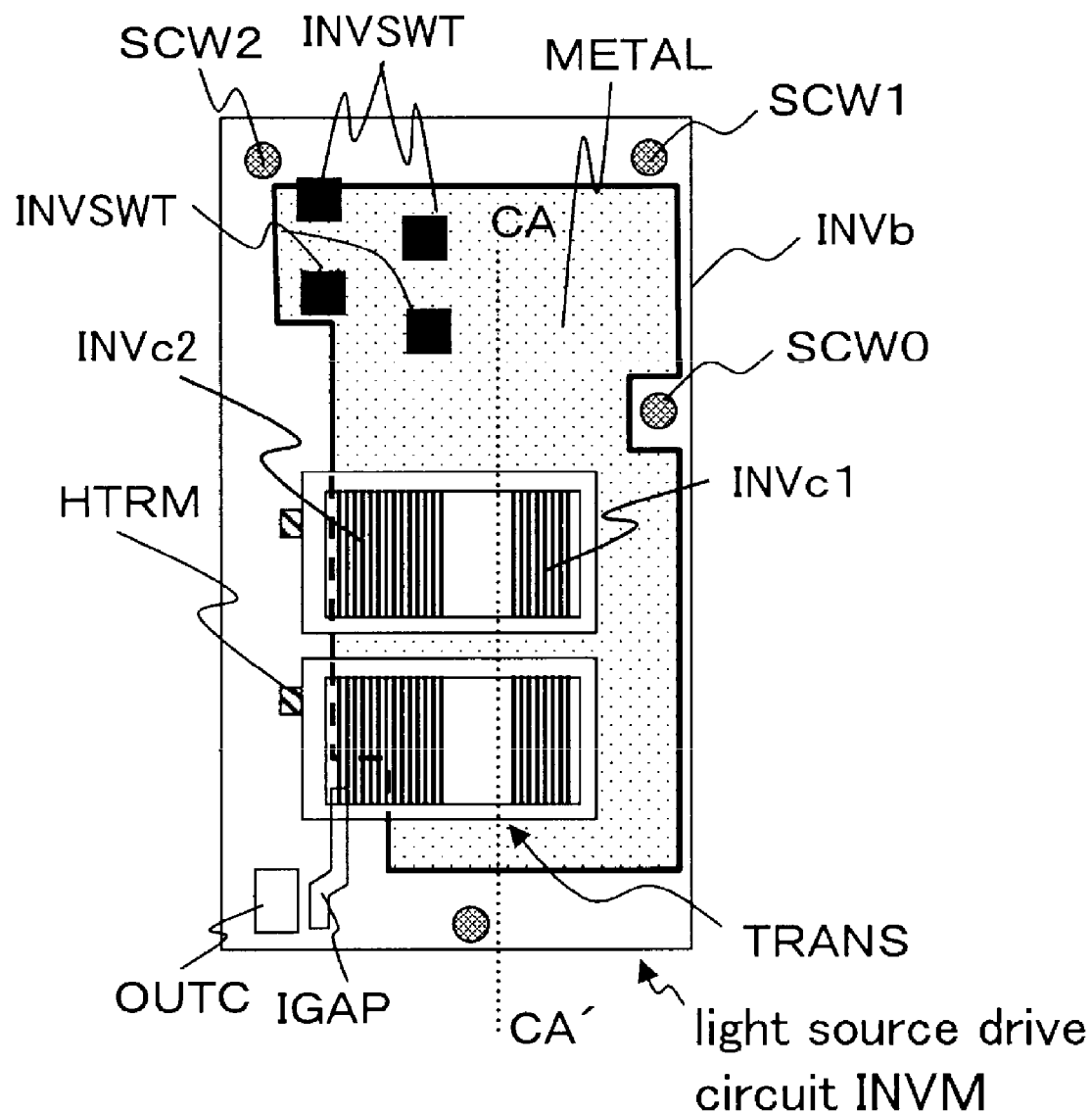
FIGS. 7A to 7D are diagrams showing the light source drive circuits according to the second embodiment of the present invention.

Another modification is described in reference to FIGS. 7A to 7D. FIG. 7A shows a case where the pasted shield metal METAL has such a form as to contain almost all of the switching transistors INVSWT. By having such a form, the four switching transistors INVSWT and such parts as the resistors that form the switching circuit INVSWTCIRCUIT in the periphery can be surrounded, and thus, the temperature of parts which locally emit heat can be lowered, as a result of the effects of heat dispersion through the shield metal.

Figure 7B:
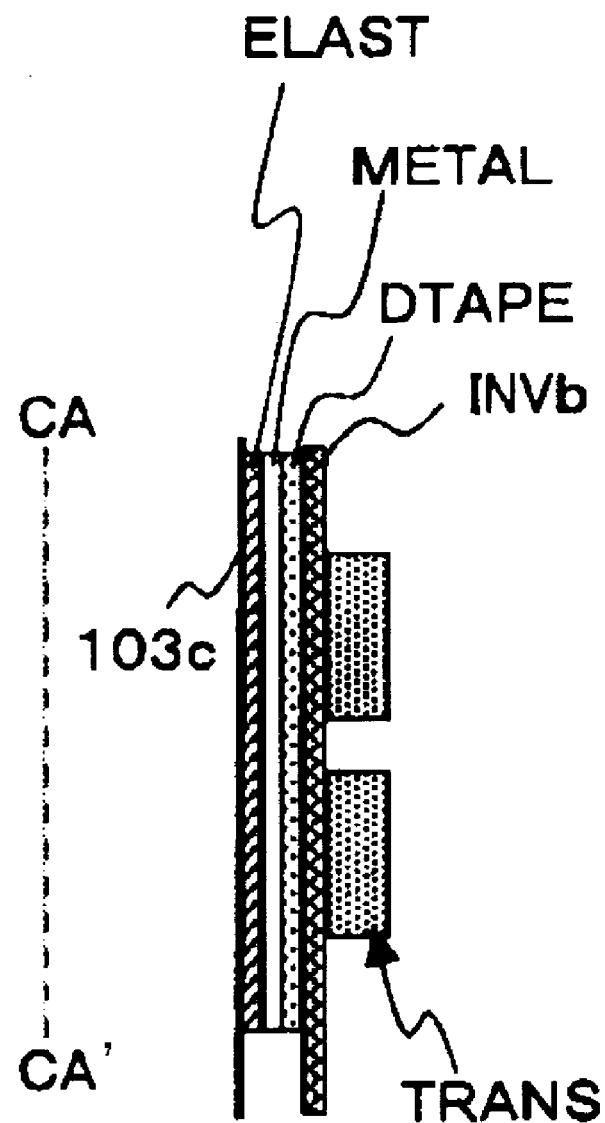

FIG. 7B is a cross sectional diagram along line CA-CA' in FIG. 7A.

Figure 7C:
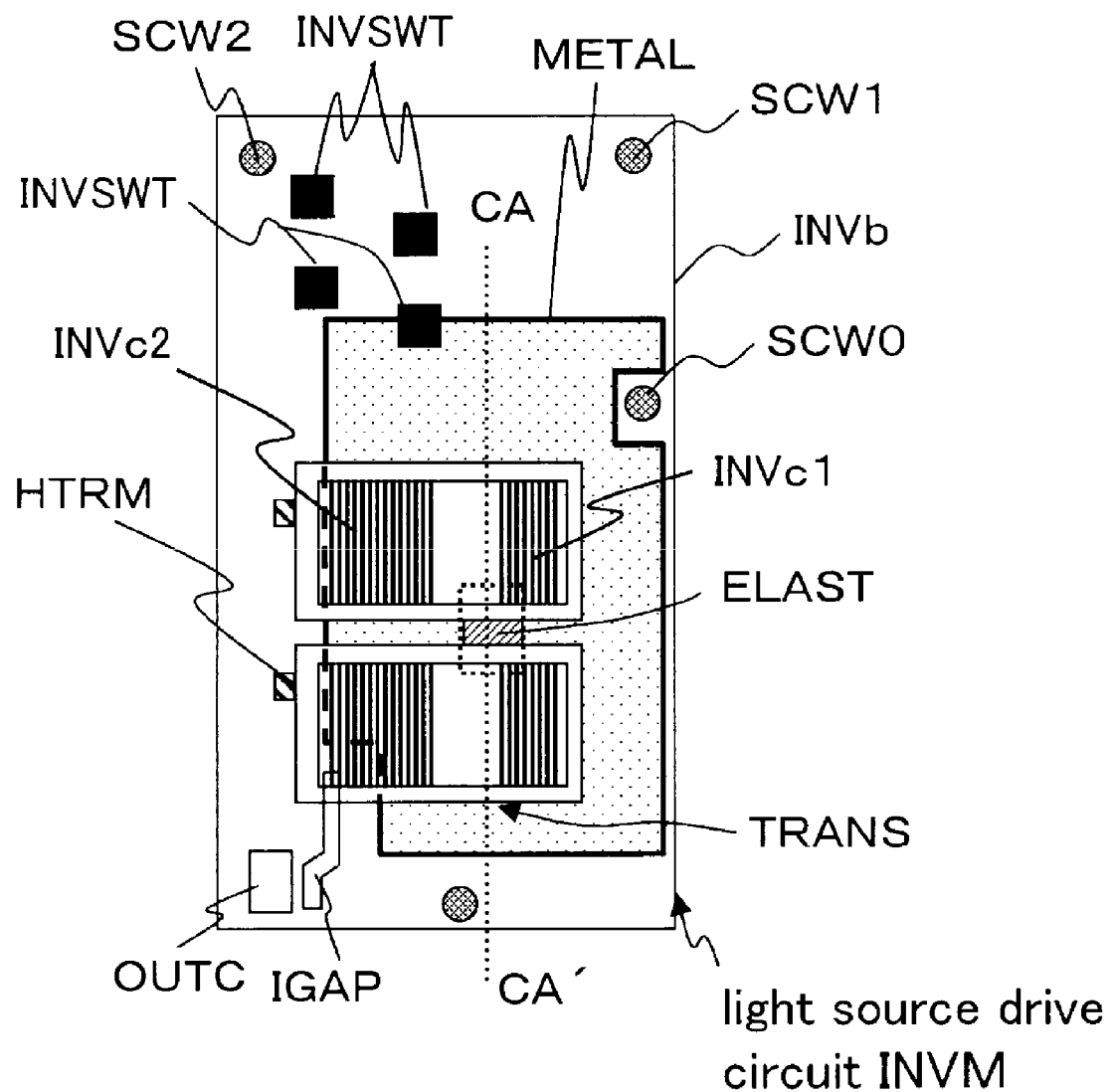
Figure 7D:
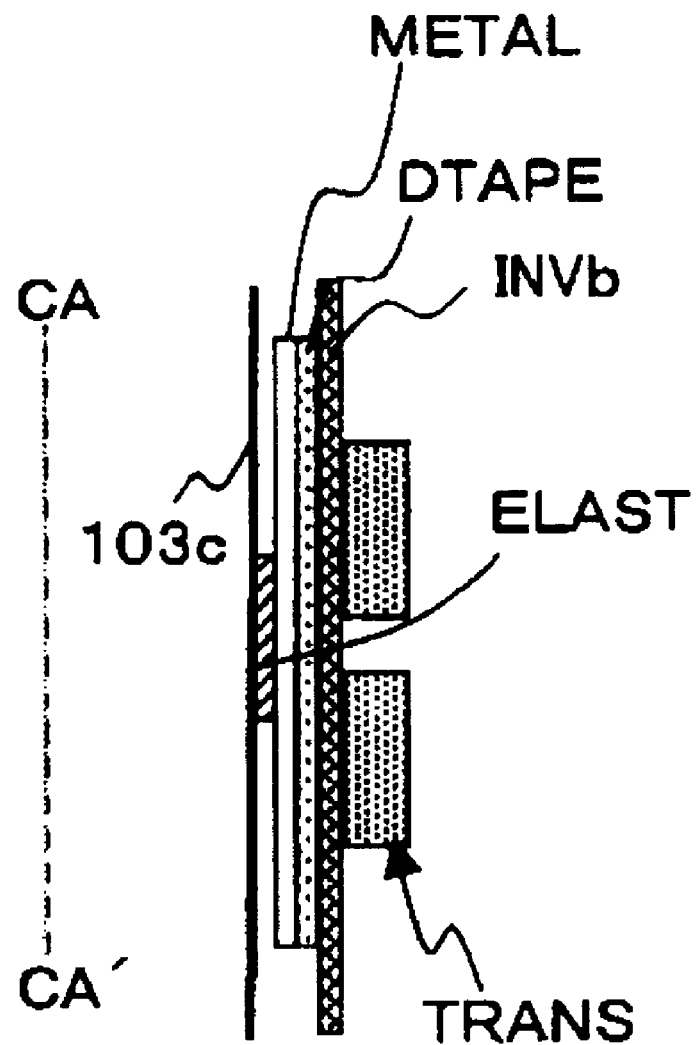

FIG. 7C shows a configuration where the shield metal METAL is secured and the shield metal can be prevented from coming off and the above described measures against sound can be taken. FIG. 7D is a cross sectional diagram along line CA-CA' in FIG. 7C. In the configuration in FIG. 7C, the elastic body ELAST is a square of approximately 10 mm and located in the middle between the two transformers TRANS instead of an elastic body ELAST placed so as to face the entirety of the shield metal METAL.

The amount of industrial waste is reduced by reducing the amount of elastic body ELAST. In addition, in the case where the elastic body ELAST is adhesive on both sides, it is preferable for the elastic body ELAST to be small, so that it can be peeled off if pasted in the wrong place during the manufacturing process.

The elastic body ELAST is placed in the vicinity of the above described transformer, and thus, the shield metal METAL makes contact with the inverter circuit substrate INVb in the vicinity of the above described transformer, via the double-sided adhesive tape DTAPE. It is important for the measures against sound to make the shield metal METAL make close contact with the inverter circuit substrate INVb in the vicinity of the above described transformer.

Accordingly, the configuration allows for close contact in important places, so that measures against sound can be taken.

In addition, the elastic body ELAST is provided so as to mechanically hold the shield metal METAL, and thus, effects of preventing the metal from coming off can also be gained.

In addition, an elastic body ELAST which is adhesive on both sides is used in the present configuration, in order to prevent the metal from coming off.

Furthermore, as shown in FIGS. 6 and 7A, the shield metal METAL is in C shape around the screw SCW0, so that the metal can be prevented from coming off. The lower frame 103c has a protrusion around a screw hole for the screw SCW0 equal to the distance between the inverter circuit substrate INVb and the lower frame 103c (not shown).

The shield metal is in C shape so that it can be hooked by the above described protrusion. Therefore, effects of preventing the metal from coming off can be gained as a result of the shield metal METAL being in C shape. It is desirable for the shield metal METAL to have such a form as to cover half or more of the screw hole for the above described screw in the portion in which the above described light source drive circuit is screwed to the above described lower frame.

Third Embodiment

In the following, the best mode for carrying out the present invention is described in detail in reference to FIGS. 8A to 8C.

Figure 8A:
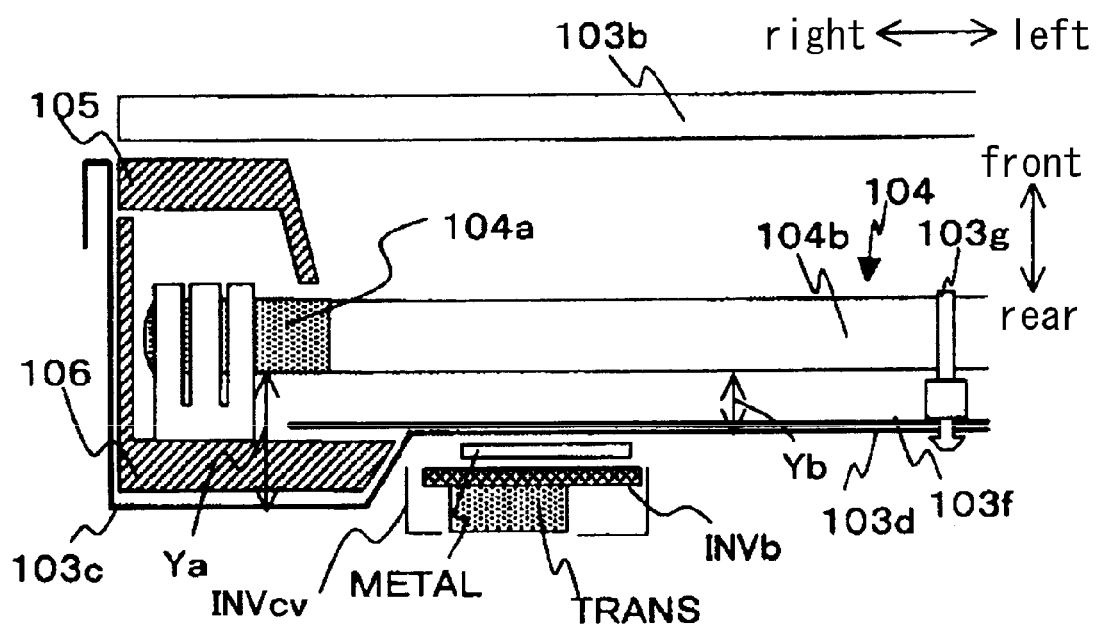
FIGS. 8A to 8C are diagrams showing the thin backlight and the light source drive circuits according to the third embodiment of the present invention.

FIG. 8A is a diagram showing the thin backlight according to the third embodiment. Here, the members and devices shown in the figures and described in the first and second embodiments are omitted.

In accordance with the method for securing the shield metal METAL in the present embodiment, screw holes are created in the portions METALc created by drawing the shield metal METAL through press processing, and the shield metal is fixed with screws together with the inverter circuit substrate INVb.

Figure 8B:
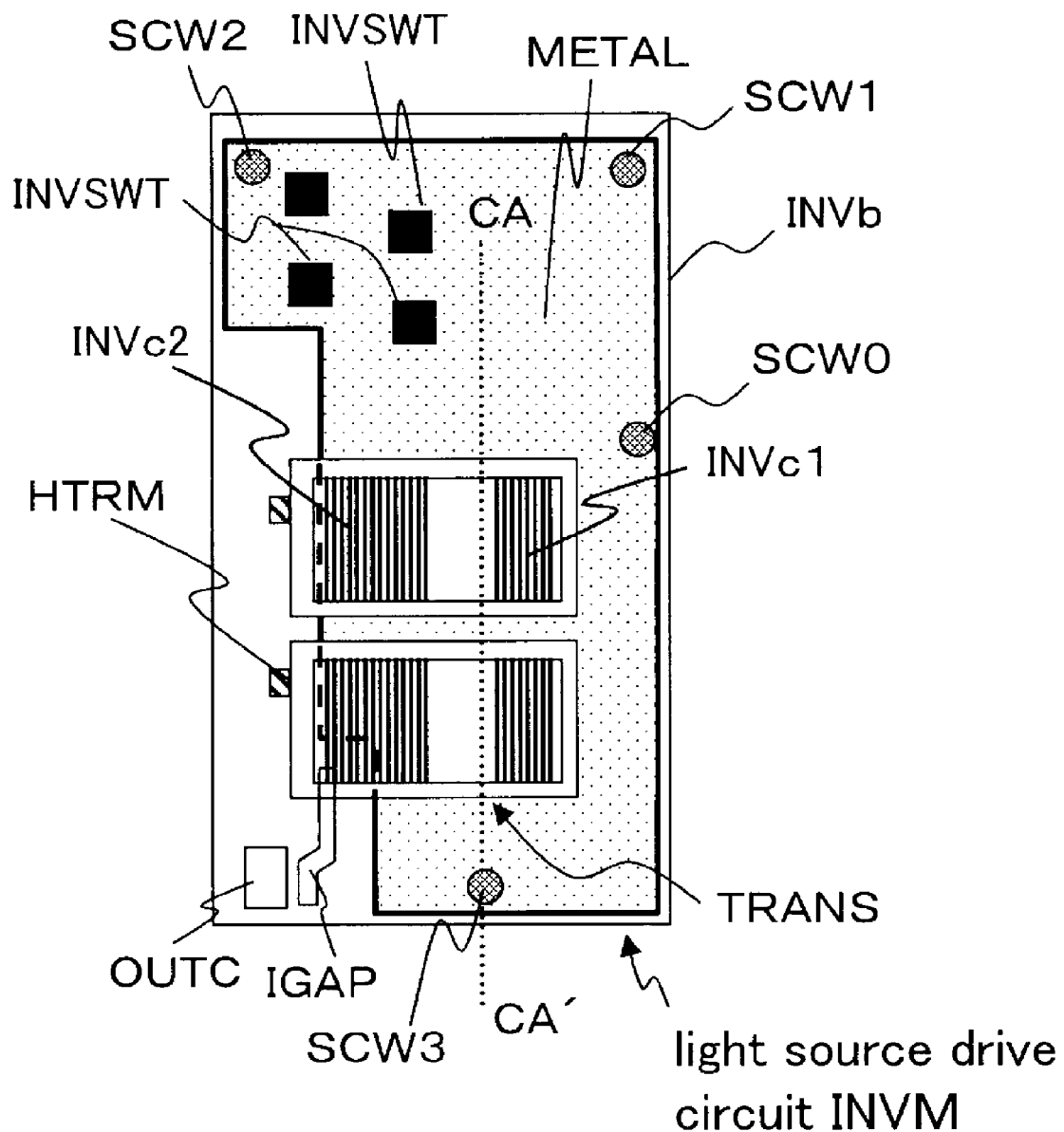
Figure 8C:
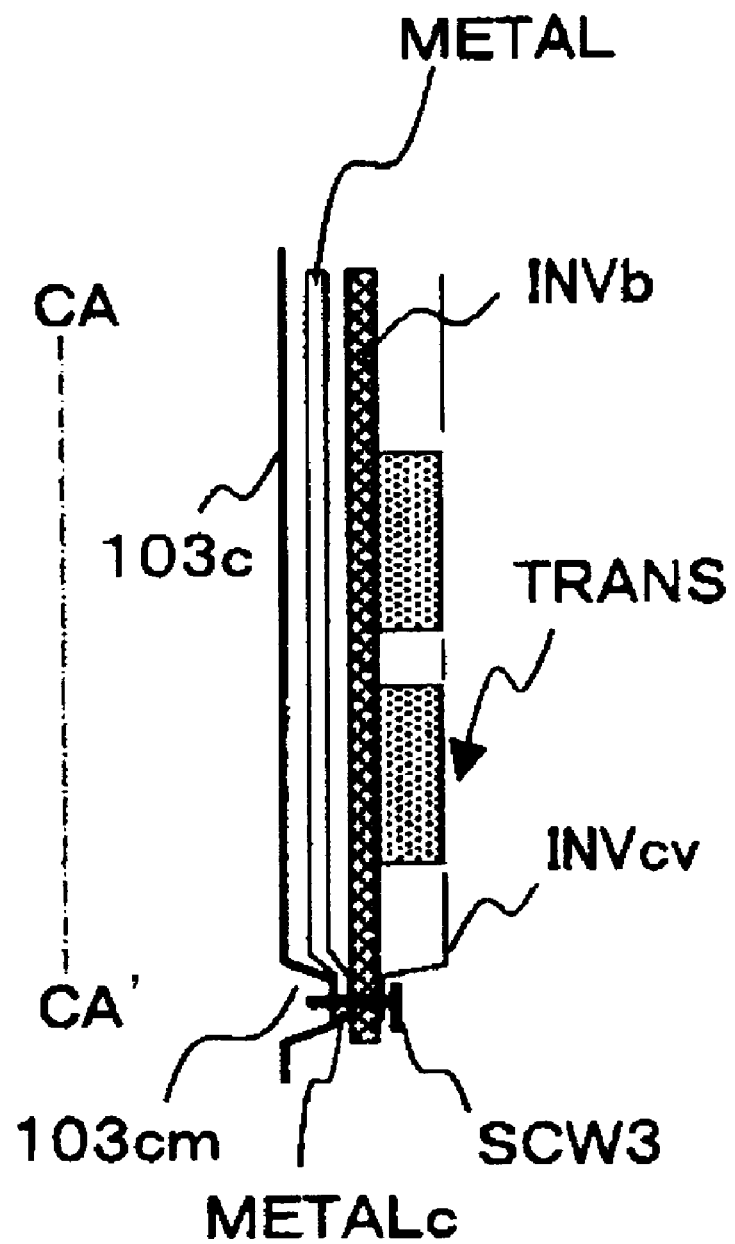

FIG. 8B shows a light source drive circuit, and FIG. 8C is a cross sectional diagram along line CA-CA' in FIG. 8B. The lower frame 103c has protruding portions 103cm which correspond to locations for fixture using screws. The protruding portions 103cm have screw holes.

The lower frame and the shield metal METAL are adjusted so that the above described screw holes match in screw hole portions METALc, and thus, the lower frame is screwed together with the inverter circuit substrate INVb and the inverter cover INVcv.

The shield metal METAL in the present embodiment is fixed with screws SCW0, SCW1 and SCW2 in accordance with the same method as for fixing using screw SCW3.

The shield metal METAL does not make contact with the transformer TRANS, and therefore, vibrations are not transmitted from the transformer TRANS, and thus, there is no noise when the sheet metal METAL vibrates in the configuration. In addition, the shield metal is mechanically screwed, and therefore does not come off. In addition, no elastic body ELAST or double-sided adhesive tape DTAPE is used, and thus, there are effects such that there is less industrial waste.

In addition, a cushioning material may be inserted between the screw hole portions METALc of the shield metal METAL and the inverter circuit substrate INVb so that the vibration can be completely prevented from being transmitted to the shield metal METAL, for example. The cushioning material may be cloth or a resin.

The shield metal METAL does not make contact with the transformer TRANS or the inverter circuit substrate INVb with which the transformer TRANS makes contact, except in end portions, through which the metal is screwed, and therefore, the shield metal METAL does not easily vibrate.

In addition, the shield metal METAL makes contact with the lower frame only in end portions, through which the metal is screwed, and therefore, even the shield metal METAL being heated through induction heating or heat radiation does not easily affect the lower frame.

In addition, the shield metal METAL is approximately the same as the inverter circuit substrate INVb in size, and therefore, the shield metal does not warp as the rear side of the lower frame, and the distance between the shield metal METAL and the transformer TRANS does not easily change, and thus, there is little inconsistency in the value of the parasitic capacitance and the parasitic inductance between the shield metal METAL and the transformer TRANS in comparison with in the case where the metal is pasted to the lower frame.

Fourth Embodiment

In the following, the best mode for carrying out the present invention is described in detail in reference to FIGS. 9A to 9C.

Figure 9A:
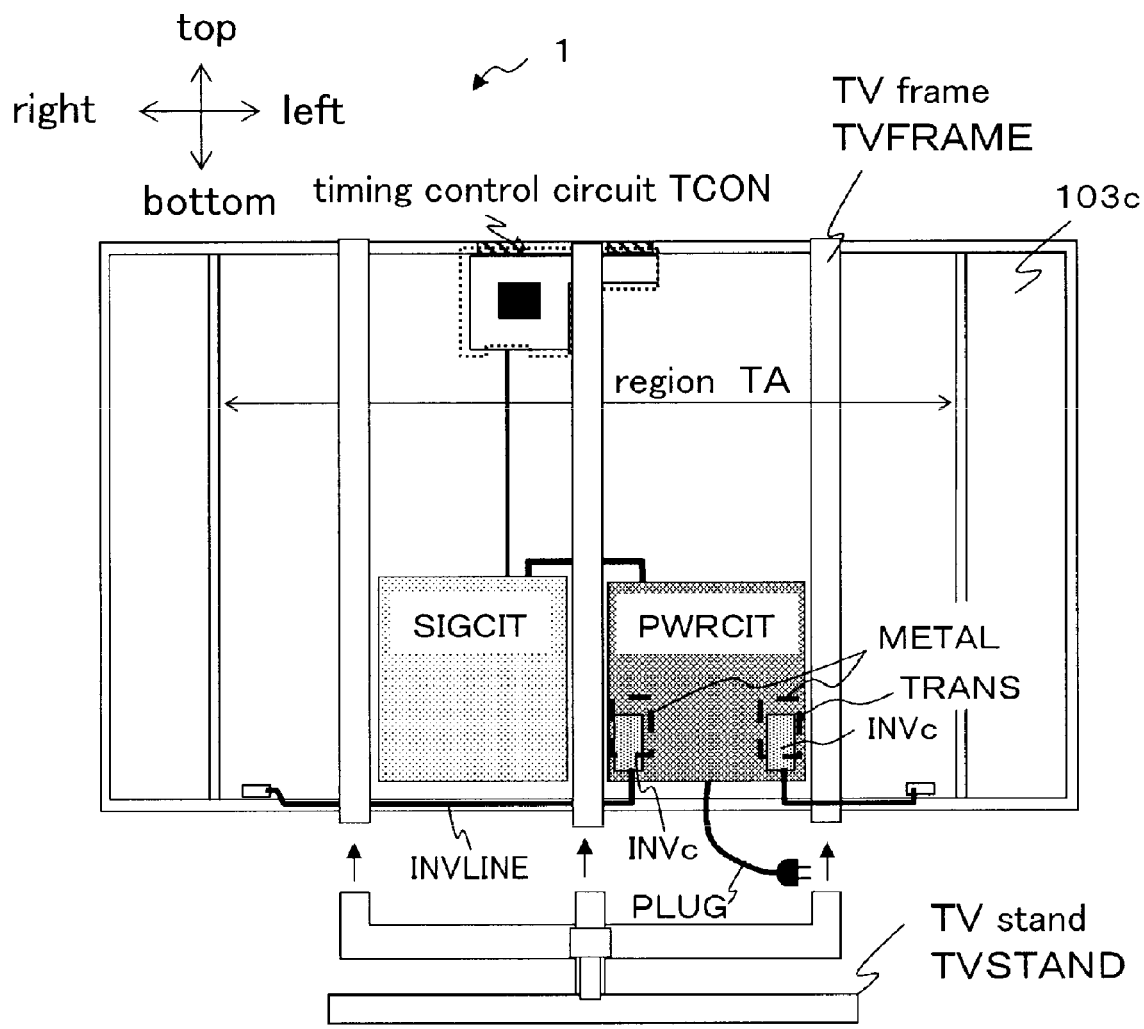
FIGS. 9A to 9C are diagrams showing a liquid crystal display device in which the thin backlight according to the fourth embodiment of the present invention is mounted.

FIG. 9A is a diagram showing a liquid crystal display device on which the thin backlight according to the fourth embodiment is mounted. Here, the members and devices shown in the figure and described in the first to third embodiments are omitted.

FIG. 9A shows a liquid crystal display device in which a signal circuit SIGCIT, a power supply circuit PWRCIT and a TV frame TVFRAME are mounted.

The signal circuit SIGCIT is a circuit which manages image data gained from the outside through PC input or HDMI input, and outputs the data to the timing control circuit TCON. The signal circuit SIGCIT may include an image engine which manages image data so as to improve image quality, a circuit for managing speech sound or a tuner circuit.

The TV frame TVFRAME is a frame made of a hard metal, such as iron, for supporting the liquid crystal display device 1. A TV stand (TVSTAND) is mounted on the TV frame TVFRAME and fixed with screws, and thus used to support the liquid crystal display device 1.

In addition, in the case where the liquid crystal display device 1 is hung on a wall, a jig for installation on the wall is screwed to the TV frame TVFRAME.

The power supply circuit PWRCIT is a circuit which converts the power gained when the power supply plug PLUG is plugged in (alternating current of 100 V in case of Japan) to a predetermined voltage and voltage waveform, so that power is supplied to the circuits mounted in the liquid crystal display device. The present embodiment is a case where the light source drive circuit is mounted on the power supply circuit.

Furthermore, the liquid crystal display device 1 is used as a monitor or a TV when the outside is covered with a decorative plate, such as of a resin.

In the present embodiment also, the temperature of the lower frame 103c rises in the vicinity of the coil INVc (or the transformer TRANS) to which the light source power supply line INVLINE for supplying power to the fluorescent lamp 104 is connected as a result of induction heating, as described in the first embodiment, so that the temperature of the fluorescent lamp 104 becomes inconsistent.

Accordingly, the temperature can be prevented from rising by providing a shield metal METAL (the figure shows the form of the pasted shield metal by a dotted line) so that it faces the coil INVc, as in the first to third embodiments.

Figure 9B:
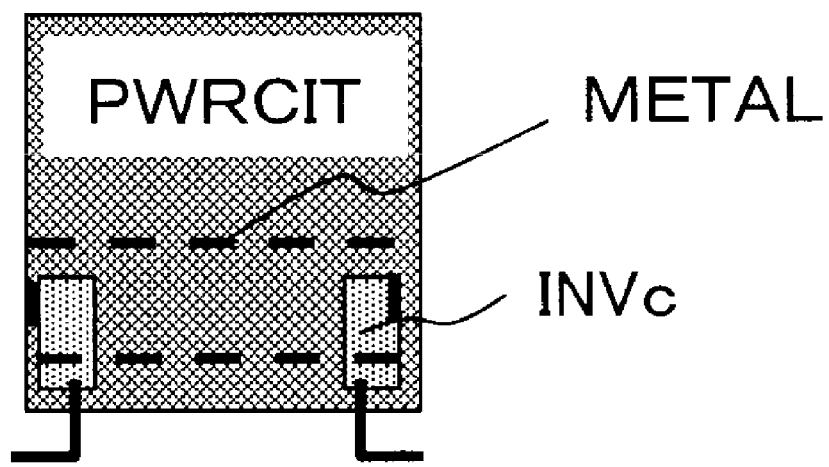

FIG. 9B shows another example where the shield metal METAL is pasted, and it is pasted so as to cross two coils INVc. Effects of heat dispersion can also be gained when the plated metal covers a large area.

Figure 9C:
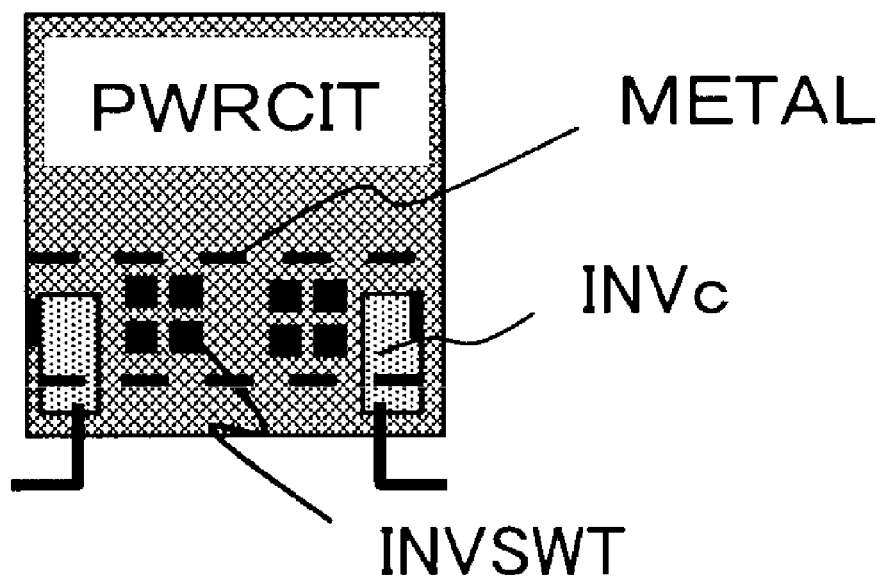

FIG. 9C shows another example where the shield metal METAL is pasted, and it is pasted so as to cross two coils INVc, and a switching transistor INVSWT is placed between the two coils INVc so that heat emitted from the switching transistor INVSWT is also dispersed.

It is possible to place various heat emitting parts, including parts of the power supply circuit, in addition to the switching transistor INVSWT, between the two coils INVc, so that heat can be dispersed.

It is possible to use the same method for fixing the shield metal METAL as in the first to third embodiments, as well as the same form.

Fifth Embodiment

In the following, the best mode for carrying out the present invention is described in detail in reference to FIGS. 10A to 10C.

Figures 10A, 10B, 10C:
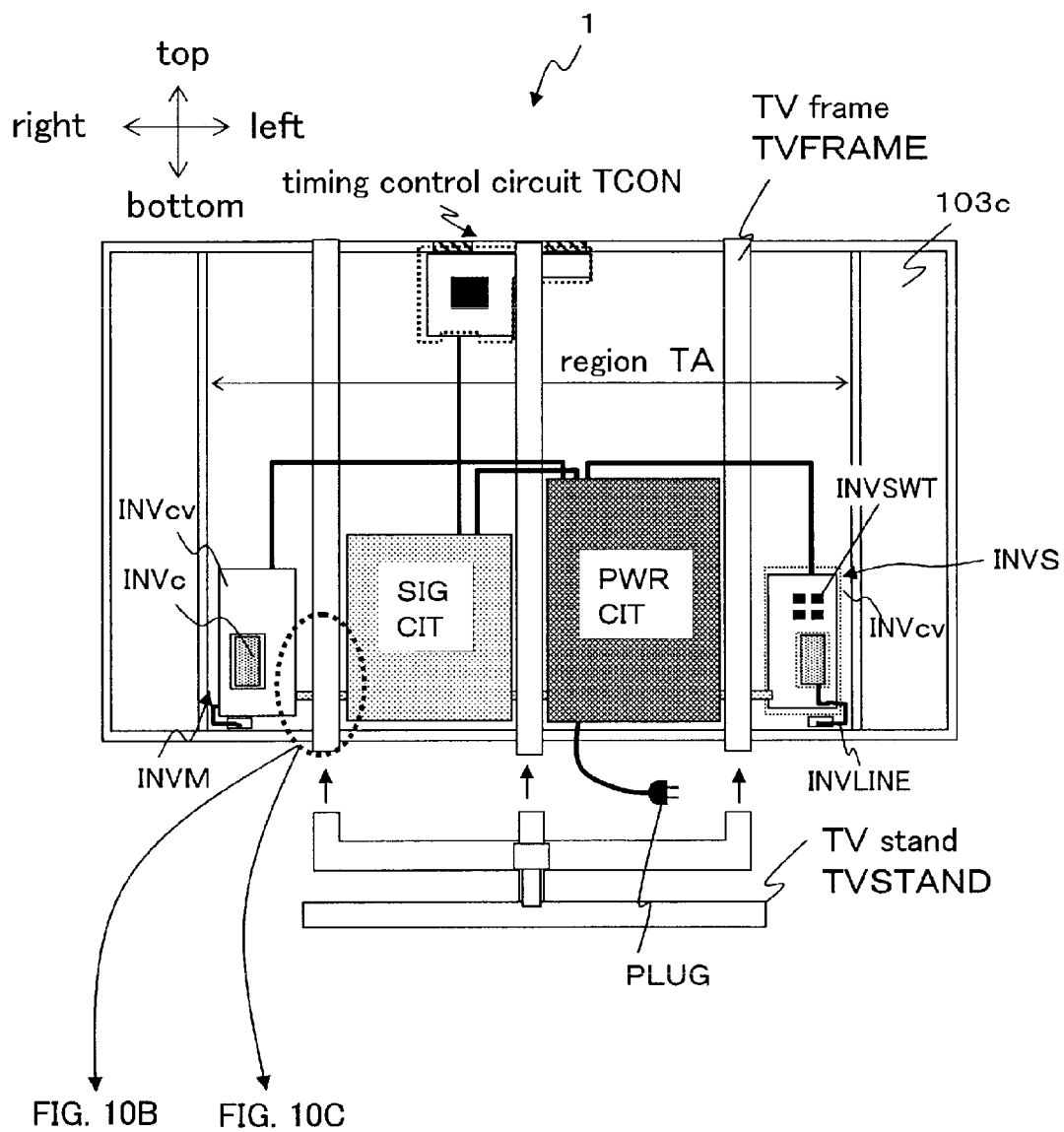
FIGS. 10A to 10C are diagrams showing a liquid crystal display device in which the thin backlight according to the fifth embodiment of the present invention is mounted.
Figure 10B:
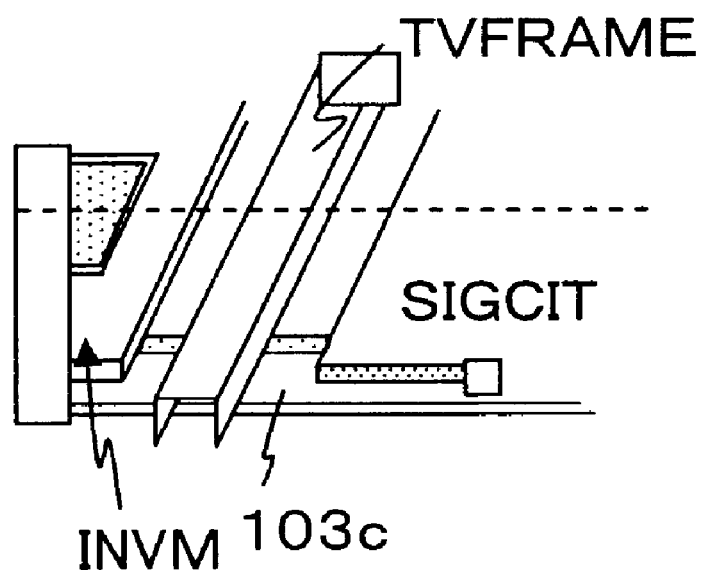
Figure 10C:
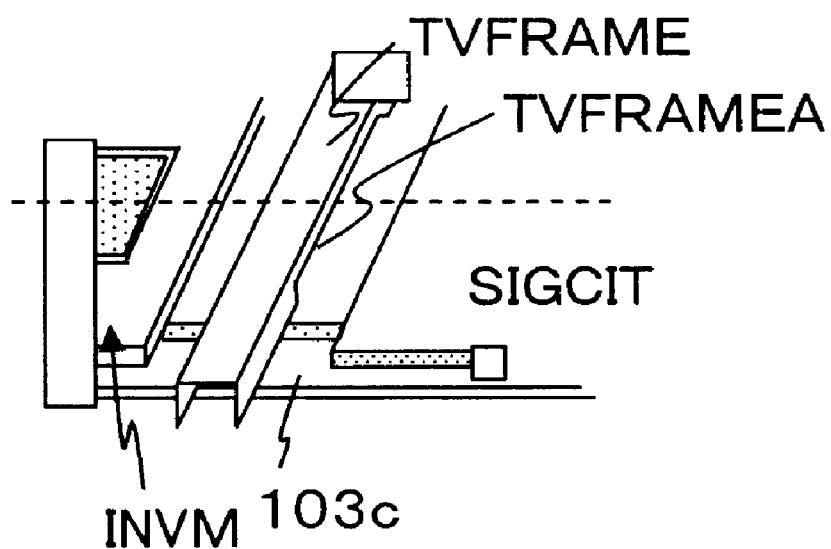

FIG. 10A is a diagram showing a liquid crystal display device in which the thin backlight according to the fifth embodiment is mounted. Here, the members and devices shown in the figure and described in the first to fourth embodiments are omitted.

FIG. 10A shows a liquid crystal display device in which a signal circuit SIGCIT, a power supply circuit PWRCIT and a TV frame TVFRAME are mounted.

One of the reasons why the difference in temperature in the lamp 124 increases is that the above described lower frame 103c is heated by the light source drive circuits INVM and INVS, while the lower frame 103c is cooled by the above described TV frame.

The TV frame TVFRAME is provided in the vicinity of the two ends, left and right, in order to maintain good structural balance. The above described light source drive circuits are also provided in locations close to the electrodes 104a of the fluorescent lamps, and thus provided in the vicinity of the two ends: left and right.

Accordingly, the above described light source drive circuits and the TV frame TVFRAME are close to each other, and there is a difference in temperature over a short distance.

The above described TV frame is cooled through the TV stand TVSTAND in the atmosphere. In many cases, the above described TV frame TVFRAME and the above described TV stand TVSTAND are made of a metal, and therefore, the lower frame 103c is cooled as a result of the high thermal conductance.

FIG. 10B is an enlarged diagram showing the TV frame TVFRAME and a portion in the vicinity of the light source drive circuit INVM. The TV frame TVFRAME makes contact with the lower frame 103c, and is thus cooled.

FIG. 10C is a diagram showing the structure of a TV frame TVFRAME which prevents cooling. This is an enlarged diagram showing the TV frame TVFRAME and a portion in the vicinity of the light source drive circuit INVM. The TV frame TVFRAME is prevented from making contact with the lower frame 103c in a location close to the light source drive circuit INVM, and thus, cooling is prevented (in the figure, the TV frame TVFRAME is prevented from making contact with the lower frame in the vicinity of the portion denoted by the symbol TVFRAMEA.

The configuration provides a region where the above described TV frame TVFRAME does not make contact with the lower frame 103c along the line in the longitudinal direction of the fluorescent lamps corresponding to the location of the coils of the above described light source drive circuits.

According to the present invention, it is possible to use the first to fourth embodiments together.

Sixth Embodiment

In the following, the best mode for carrying out the present invention is described in detail in reference to FIG. 11.

Figure 11:
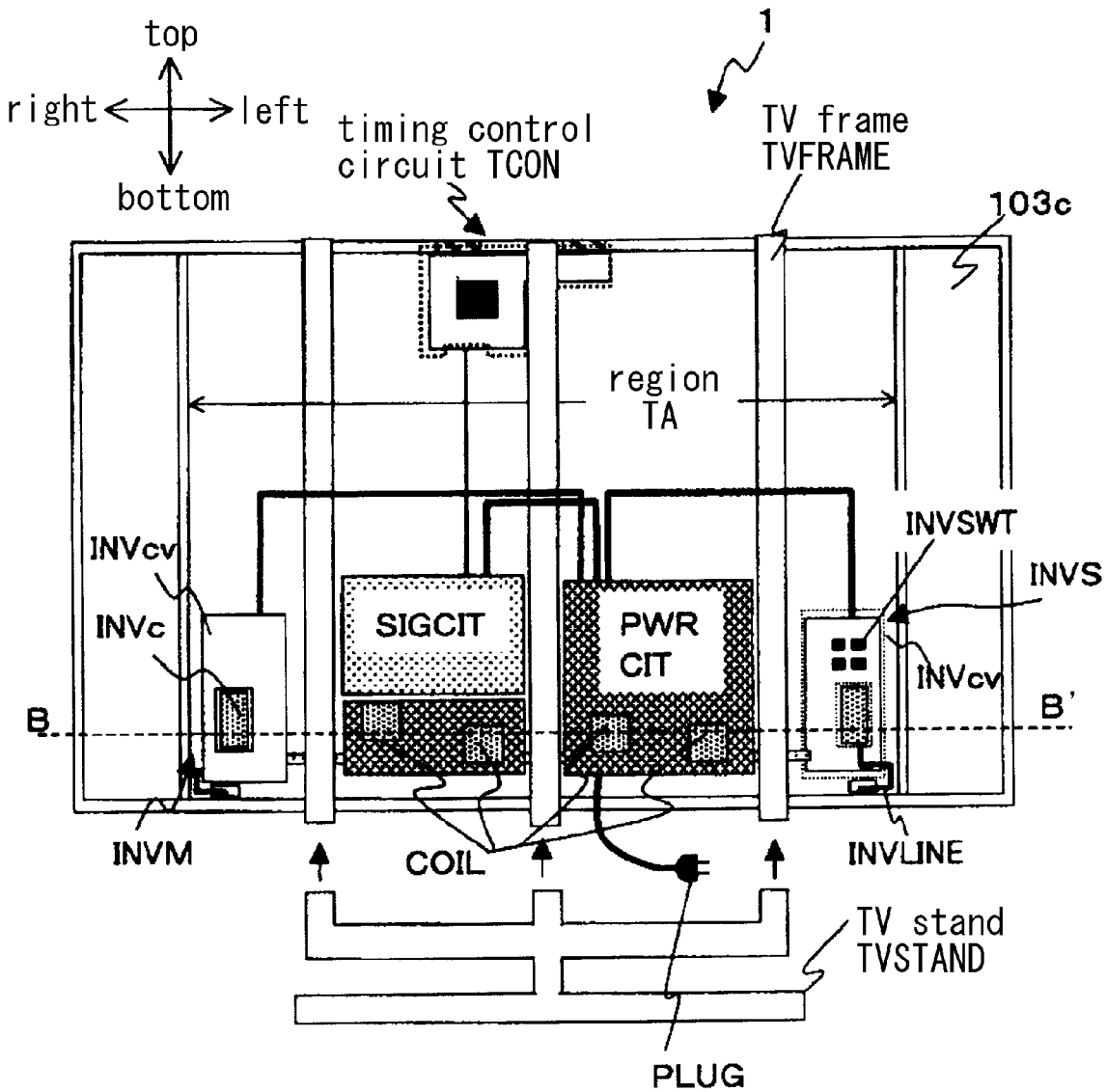
FIG. 11 is a diagram showing a liquid crystal display device in which the thin backlight according to the sixth embodiment of the present invention is mounted.

FIG. 11 is a diagram showing a liquid crystal display device in which the thin backlight according to the sixth embodiment is mounted.

Here, the members and devices shown in the figure and described in the first to fifth embodiments are omitted.

As the method for preventing the temperature of the fluorescent lamps 104 from becoming inconsistent, it is possible to provide a number of heating bodies along the fluorescent lamps 104 in order to reduce inconsistency in the temperature. The coils (INVc, COIL) heat the lower frame 103c through induction heating, and thus heat the fluorescent lamps 104, making the temperature inconsistent.

Accordingly, the coils INVc mounted in the light source drive circuits INVM and INVS, as well as the coils COIL mounted in the power supply circuit PWRCIT and the like, are aligned in parallel in the longitudinal direction of the fluorescent lamps 104 (along line B-B' in the figure), and thus, it becomes possible to raise the temperature of the fluorescent lamps as a whole, so that there is less inconsistency in the temperature.

According to the present invention, it is possible to use the first to fifth embodiments together.

The present technology described in the first to sixth embodiments allows a number of fluorescent lamps to be collectively driven, and thus is particularly effective for backlights using EEFL's as fluorescent lamps having several large coils.

In addition, CCFL type backlights where capacitors are connected to the electrodes of CCFL's in series so that the circuit becomes almost the same as that for EEFL's use several large coils, as do EEFL's, and therefore, the technology is particularly effective.

The present technology described in the first to sixth embodiments is not necessarily limited to that applied to a recess toward the front at the bottom of the lower frame.

In the case where electrodes of at least three fluorescent lamps are connected to the output of one coil so as to be collectively driven, the technology is effective, because the coil is large.

What is claimed is:

1. A liquid crystal display device, comprising:
a liquid crystal panel; and
a backlight for illuminating said liquid crystal panel, characterized in that
when the side of said liquid crystal panel on which said backlight is placed is a rear side and the side of said liquid crystal panel which is opposite to the rear side of said liquid crystal panel is a front side,
said backlight has:
a housing having a side with an opening;
a number of fluorescent lamps in long tube form which are placed inside said housing; and
a light source drive circuit with a coil which drives said number of fluorescent lamps, wherein
said number of fluorescent lamps are placed at the bottom of a lower frame which forms said housing,
the bottom of said lower frame has such a form that a recess towards the front side is provided at a predetermined location,
said light source drive circuit is placed on the rear side of said lower frame and in a region in the recess towards the front side at the bottom of said lower frame, and
a metal plate is provided between the rear side of said lower frame and the coil mounted in said light source drive circuit.

2. A liquid crystal display device, comprising:
a liquid crystal panel; and
a backlight for illuminating said liquid crystal panel, characterized in that
when the side of said liquid crystal panel on which said backlight is placed is a rear side and the side of said liquid crystal panel which is opposite to the rear side of said liquid crystal panel is a front side,
said backlight has:
a housing having a side with an opening;
a number of fluorescent lamps in long tube form which are placed inside said housing; and
a light source drive circuit with a coil which drives said number of fluorescent lamps, wherein
said number of fluorescent lamps are placed at the bottom of a lower frame which forms said housing,
a diffusion plate which diffuses light is placed so as to cover the side with an opening of said lower frame,
the bottom of said lower frame has such a form that the distance between said diffusion plate and said bottom is greater in the portions of the backlight in the vicinity of the two ends of said fluorescent lamps than in the center portion of the backlight,
said light source drive circuit is placed on the rear side of said lower frame and in such a location that the distance between said diffusion plate and the bottom of said lower frame is smaller at the bottom of said lower frame than in the portion in the vicinity of the two ends of said fluorescent lamps, and
a metal plate is provided between the rear side of said lower frame and the coil mounted in said light source drive circuit.

3. The liquid crystal display device according to claim 1, characterized in that said metal plate is made of aluminum or copper.

4. The liquid crystal display device according to claim 1, characterized in that said metal plate extends to such a location as to face a switching transistor of the light source drive circuit.

5. The liquid crystal display device according to claim 1, characterized in that there is a location where the distance between the lower end portion of the rear side of said fluorescent lamps and the bottom of said lower frame is 2 mm or less.

6. The liquid crystal display device according to claim 1, characterized in that said metal plate has such a form as to face a middle portion between the primary coil and the secondary coil of a transformer connected to a light source power supply line for supplying power to said fluorescent lamps in said light source drive circuit and as to avoid the high voltage terminal of said secondary coil connected to said light source power supply line.

7. The liquid crystal display device according to claim 1, characterized in that said metal plate is fixed to said lower frame with screws together with said light source drive circuit so that only the portions which are fixed with screws make contact with said light source drive circuit.

8. The liquid crystal display device according to claim 1, characterized in that said metal plate is pasted to the rear side of an inverter circuit substrate on which circuit parts of said light source drive circuit are mounted with a double-sided adhesive tape.

9. The liquid crystal display device according to claim 1, characterized in that said metal plate is pasted to the rear side of an inverter circuit substrate on which circuit parts of said light source drive circuit are mounted with a double-sided adhesive tape so that an elastic body is sandwiched between said metal plate and said lower frame.

10. The liquid crystal display device according to claim 9, characterized in that the size of said elastic body is smaller than that of said metal plate.

11. The liquid crystal display device according to claim 8, characterized in that the distance between said inverter circuit substrate and the lower frame is 2 mm or less.

12. The liquid crystal display device according to claim 1, characterized in that said metal plate has such a form as to surround the portions of half or more of each hole for said screws through which said light source drive circuit is secured to said lower frame with screws.

13. The liquid crystal display device according to claim 1, characterized in that when said light source drive circuit is mounted on a power supply circuit which generates a power supply voltage for a circuit mounted on the liquid crystal display device, said metal plate is placed in such a location as to face a coil connected to the light source power supply line.

14. A liquid crystal display device, comprising:
a liquid crystal panel; and
a backlight for illuminating said liquid crystal panel, characterized in that
said liquid crystal display device comprises a number of structurally reinforcing frames in rod form made of a metal,
when the side of said liquid crystal panel on which said backlight is placed is a rear side and the side of said liquid crystal panel which is opposite to the rear side of said liquid crystal panel is a front side,
said backlight has:
a housing having a side with an opening;
a number of fluorescent lamps in long tube form which are placed inside said housing; and
a light source drive circuit with a coil which drives said number of fluorescent lamps, wherein
said number of fluorescent lamps are placed in parallel at the bottom of a lower frame which forms said housing,
the bottom of said lower frame has such a form that a recess towards the front side is provided at a predetermined location,
said light source drive circuit is placed on the rear side of said lower frame and in a region in the recess towards the front side at the bottom of said lower frame,
a metal plate is provided between the rear side of said lower frame and the coil mounted in said light source drive circuit, and
there is a region where said structurally reinforcing frame does not make contact with said lower frame along a line in the longitudinal direction of the fluorescent lamps so as to correspond to the location of the coil in said light source drive circuit.

15. A liquid crystal display device, comprising:
a liquid crystal panel; and
a backlight for illuminating said liquid crystal panel, characterized in that
said liquid crystal display device comprises a number of coils,
when the side of said liquid crystal panel on which said backlight is placed is a rear side and the side of said liquid crystal panel which is opposite to the rear side of said liquid crystal panel is a front side,
said backlight has:
a housing having a side with an opening;
a number of fluorescent lamps in long tube form which are placed inside said housing; and
a light source drive circuit with a coil which drives said number of fluorescent lamps, wherein
said number of fluorescent lamps are placed in parallel at the bottom of a lower frame which forms said housing,
the bottom of said lower frame has such a form that a recess towards the front side is provided at a predetermined location,
said light source drive circuit is placed on the rear side of said lower frame and in a region in the recess towards the front side at the bottom of said lower frame,
a metal plate is provided between the rear side of said lower frame and the coil mounted in said light source drive circuit, and
at least some coils from among said number of coils are provided along a line in the longitudinal direction of the fluorescent lamps so as to correspond to the location of the coil in said light source drive circuit.

16. The liquid crystal display device according to claim 1, characterized in that electrodes of at least three fluorescent lamps from among said fluorescent lamps are connected to one coil.

17. The liquid crystal display device according to claim 1, characterized in that said fluorescent lamps are either external electrode fluorescent lamps (EEFL's) or cold cathode fluorescent lamps (CCFL's) where capacitors are connected to electrodes in series.

18. A liquid crystal display device, comprising:
a liquid crystal panel; and
a backlight for illuminating said liquid crystal panel, characterized in that
when the side of said liquid crystal panel on which said backlight is placed is a rear side and the side of said liquid crystal panel which is opposite to the rear side of said liquid crystal panel is a front side,
said backlight has:
a housing having a side with an opening;
a number of fluorescent lamps in long tube form which are placed inside said housing; and
a light source drive circuit with a coil which drives said number of fluorescent lamps, wherein
said number of fluorescent lamps are placed at the bottom of a lower frame which forms said housing,
said light source drive circuit is placed on the rear side of said lower frame, and
a metal plate is provided between the rear side of said lower frame and the coil mounted in said light source drive circuit so that said metal plate is pasted to said light source drive circuit using a double-sided adhesive means.

19. The liquid crystal display device according to claim 18, characterized in that there is a portion where the distance between the lower end on the rear side of said fluorescent lamps and the bottom of said lower frame is 2 mm or less, and there is a portion where the distance between the inverter circuit substrate on which circuit parts of said light source drive circuit are mounted and the lower frame is 2 mm or less.

20. The liquid crystal display device according to claim 18, characterized in that when the distance between a plane, including the side of said housing having an opening, and the bottom of said lower frame is a diffusion distance, the diffusion distance is 10 mm or less.

21. The liquid crystal display device according to claim 1, characterized in that the recess is delimited by portions of the rear side of said lower frame and having an opening facing away from the liquid crystal panel into which said light source drive circuit is received, and said metal plate is provided in a region in the recess.

22. The liquid crystal display device according to claim 14, characterized in that the recess is delimited by portions of the rear side of said lower frame and having an opening facing away from the liquid crystal panel into which said light source drive circuit is received, and a metal plate is provided in a region in the recess between the rear side of said lower frame and the coil of said light source drive circuit.

23. The liquid crystal display device according to claim 15, characterized in that the recess is delimited by portions of the rear side of said lower frame and having an opening facing away from the liquid crystal panel into which said light source drive circuit is received, and a metal plate is provided in a region in the recess between the rear side of said lower frame and the coil of said light source drive circuit.

24. The liquid crystal display device according to claim 2, characterized in that the metal plate is placed in such a location at the rear side of said lower frame between the rear side of said lower frame and the coil of said light source drive circuit where the distance between said diffusion plate and the bottom of said lower frame is smaller than in the portion in the vicinity of the two ends of said fluorescent lamps.

25. The liquid crystal display device according to claim 1, further comprising a controller for supplying control signals to the liquid crystal panel.

* * * * *